US010663201B2

(12) United States Patent
Hayes

(10) Patent No.: US 10,663,201 B2
(45) Date of Patent: May 26, 2020

(54) CO2 REFRIGERATION SYSTEM WITH SUPERCRITICAL SUBCOOLING CONTROL

(71) Applicant: Hill Phoenix, Inc., Conyers, GA (US)

(72) Inventor: Niel M. Hayes, Conyers, GA (US)

(73) Assignee: Hill Phoenix, Inc., Conyers, GA (US)

( * ) Notice: Subject to any disclaimer, the term of this patent is extended or adjusted under 35 U.S.C. 154(b) by 100 days.

(21) Appl. No.: 16/167,763

(22) Filed: Oct. 23, 2018

(65) Prior Publication Data
US 2020/0124330 A1    Apr. 23, 2020

(51) Int. Cl.
F25B 49/02 (2006.01)
F25B 41/04 (2006.01)
(Continued)

(52) U.S. Cl.
CPC .............. F25B 49/02 (2013.01); F25B 1/10 (2013.01); F25B 9/008 (2013.01); F25B 40/02 (2013.01);
(Continued)

(58) Field of Classification Search
CPC .......... F25B 9/008; F25B 40/02; F25B 40/06; F25B 41/04; F25B 41/062; F25B 49/02;
(Continued)

(56) References Cited

U.S. PATENT DOCUMENTS 4,270,363 A   6/1981 Maring et al.
4,589,263 A   5/1986 Dicarlo et al.
(Continued)

FOREIGN PATENT DOCUMENTS

EP   1 789 732    5/2007
EP   1 848 933    12/2010
(Continued)

OTHER PUBLICATIONS

Co2oltec, A world first in technology: Refrigeration with CO2, special print from KK Die Kalte & Klimatechnik, Edition Feb. 2005, 15 pps.
(Continued)

Primary Examiner — Marc E Norman

(57) ABSTRACT

A refrigeration system includes a gas cooler/condenser configured to remove heat from a refrigerant, a temperature sensor configured to measure a temperature of the refrigerant leaving the gas cooler/condenser, a pressure sensor located along the high pressure conduit and configured to measure a pressure of the refrigerant leaving the gas cooler/condenser, a pressure control valve operable to regulate the pressure of the refrigerant leaving the gas cooler/condenser, and a controller. The controller is configured to determine whether the refrigerant leaving the gas cooler/condenser is in a subcritical region based on at least one of the measured temperature of the refrigerant or the measured pressure of the refrigerant. If the refrigerant leaving the gas cooler/condenser is not in the subcritical region, the controller is configured to add a pseudo-subcooling temperature value to the measured temperature of the refrigerant to calculate a summed temperature, calculate a supercritical pseudo-saturated pressure as a function of the summed temperature, and operate the pressure control valve to drive the pressure of the refrigerant leaving the gas cooler/condenser to the supercritical pseudo-saturated pressure corresponding to the summed temperature.

7 Claims, 9 Drawing Sheets

(51) Int. Cl.
*F25B 9/00* (2006.01)
*F25B 40/02* (2006.01)
*F25B 40/06* (2006.01)
*F25B 41/06* (2006.01)
*F25B 1/10* (2006.01)

(52) U.S. Cl.
CPC .............. *F25B 40/06* (2013.01); *F25B 41/04* (2013.01); *F25B 41/062* (2013.01); *F25B 2309/061* (2013.01); *F25B 2500/18* (2013.01); *F25B 2500/19* (2013.01); *F25B 2600/2501* (2013.01); *F25B 2600/2503* (2013.01); *F25B 2600/2513* (2013.01); *F25B 2700/195* (2013.01); *F25B 2700/21163* (2013.01)

(58) Field of Classification Search
CPC ............ F25B 2309/061; F25B 2500/18; F25B 2500/19; F25B 2600/2503; F25B 2600/2513; F25B 2700/195; F25B 2700/21163
See application file for complete search history.

(56) References Cited

U.S. PATENT DOCUMENTS

| | | | |
|---|---|---|---|
| 5,425,246 A | 6/1995 | Bessler | |
| 5,539,382 A | 7/1996 | Duff et al. | |
| 6,385,980 B1 | 5/2002 | Sienel | |
| 6,415,611 B1 | 7/2002 | Acharya et al. | |
| 6,418,735 B1 * | 7/2002 | Sienel | F25B 6/02 62/115 |
| 7,065,979 B2 | 6/2006 | Arshansky et al. | |
| 7,406,837 B2 | 8/2008 | Nemoto et al. | |
| 7,913,506 B2 | 3/2011 | Bittner et al. | |
| 8,011,192 B2 | 9/2011 | Gupte | |
| 8,511,103 B2 | 8/2013 | Welch | |
| 8,631,666 B2 | 1/2014 | Hinde et al. | |
| 8,756,947 B2 | 6/2014 | Chen et al. | |
| 8,966,934 B2 | 3/2015 | Christensen | |
| 9,121,631 B2 | 9/2015 | Cho et al. | |
| 9,151,521 B2 | 10/2015 | Bittner | |
| 9,335,079 B2 | 5/2016 | Huff et al. | |
| 9,353,980 B2 | 5/2016 | Ignatiev | |
| 9,395,112 B2 * | 7/2016 | Prins | F25B 9/008 |
| 9,470,435 B2 | 10/2016 | Hinde et al. | |
| 9,541,311 B2 | 1/2017 | Hinde et al. | |
| 9,625,183 B2 * | 4/2017 | Wallace | F25B 9/008 |
| 9,657,977 B2 | 5/2017 | Hinde et al. | |
| 9,664,424 B2 | 5/2017 | Hinde et al. | |
| 9,689,590 B2 | 6/2017 | Christensen | |
| 2003/0182961 A1 | 10/2003 | Nishida et al. | |
| 2005/0011221 A1 | 1/2005 | Hirota | |
| 2005/0217278 A1 | 10/2005 | Mongia et al. | |
| 2008/0098754 A1 | 5/2008 | Sommer et al. | |
| 2008/0196420 A1 | 8/2008 | Gernemann | |
| 2008/0264077 A1 * | 10/2008 | Heinbokel | F25B 9/008 62/115 |
| 2010/0000245 A1 * | 1/2010 | Kasahara | F25B 9/008 62/222 |
| 2010/0199707 A1 | 8/2010 | Pearson | |
| 2010/0263393 A1 | 10/2010 | Chen et al. | |
| 2011/0036110 A1 | 2/2011 | Fujimoto et al. | |
| 2011/0041527 A1 | 2/2011 | Jakobsen et al. | |
| 2011/0162397 A1 | 7/2011 | Huff et al. | |
| 2011/0314843 A1 | 12/2011 | Heinbokel et al. | |
| 2012/0000237 A1 | 1/2012 | Yamada et al. | |
| 2012/0011866 A1 | 1/2012 | Scarcella et al. | |
| 2012/0055182 A1 | 3/2012 | Dube | |
| 2012/0073319 A1 | 3/2012 | Dube | |
| 2012/0192579 A1 | 8/2012 | Huff et al. | |
| 2012/0247148 A1 | 10/2012 | Dube | |
| 2013/0125569 A1 | 5/2013 | Verma et al. | |
| 2013/0233009 A1 | 9/2013 | Dube | |
| 2013/0298593 A1 | 11/2013 | Christensen | |
| 2014/0007603 A1 | 1/2014 | Dube | |
| 2014/0116075 A1 * | 5/2014 | Prins | F25B 9/008 62/115 |
| 2014/0157811 A1 * | 6/2014 | Shimazu | F25B 1/10 62/238.6 |
| 2014/0208785 A1 * | 7/2014 | Wallace | F25B 9/008 62/115 |
| 2014/0291411 A1 | 10/2014 | Tamaki et al. | |
| 2014/0352343 A1 | 12/2014 | Hinde et al. | |
| 2015/0052927 A1 | 2/2015 | Yang et al. | |
| 2015/0128628 A1 | 5/2015 | Kawagoe et al. | |
| 2015/0345835 A1 | 12/2015 | Martin et al. | |
| 2015/0354882 A1 | 12/2015 | Dube | |
| 2016/0102901 A1 | 4/2016 | Christensen et al. | |
| 2016/0245575 A1 | 8/2016 | Dube | |
| 2017/0363377 A1 | 12/2017 | Swofford et al. | |
| 2018/0216851 A1 | 8/2018 | Christensen et al. | |
| 2019/0368786 A1 * | 12/2019 | Newel | F25B 40/02 |
| 2020/0033039 A1 * | 1/2020 | Krishnamoorthy | F25B 41/04 |

FOREIGN PATENT DOCUMENTS

| | | |
|---|---|---|
| EP | 2 078 178 A1 | 5/2016 |
| EP | 2 329 206 A2 | 10/2016 |
| EP | 2 212 631 A1 | 12/2016 |
| GB | 2 460 726 | 12/2009 |
| JP | 2004-257694 A | 9/2004 |
| JP | 2005-024210 A | 1/2005 |
| JP | 2011-503504 A | 1/2011 |
| WO | WO-2006/087011 | 8/2006 |
| WO | WO-2006/091190 | 8/2006 |
| WO | WO-2009/086493 A2 | 7/2009 |
| WO | WO-2010/045743 A1 | 4/2010 |
| WO | WO-2011/066214 A1 | 6/2011 |
| WO | WO-2013/169591 A1 | 11/2013 |
| WO | WO-2014/068967 A1 | 5/2014 |
| WO | WO-2014/179699 A1 | 11/2014 |

OTHER PUBLICATIONS

Heat recovery from CO2 based refrigeration systems, Advansor Energisystemer, dated Mar. 26, 2008, 5 pps.
Heos user manual for high efficiency showcase controller, Carel Industries, dated Sep. 24, 2015, 56 pps.

* cited by examiner

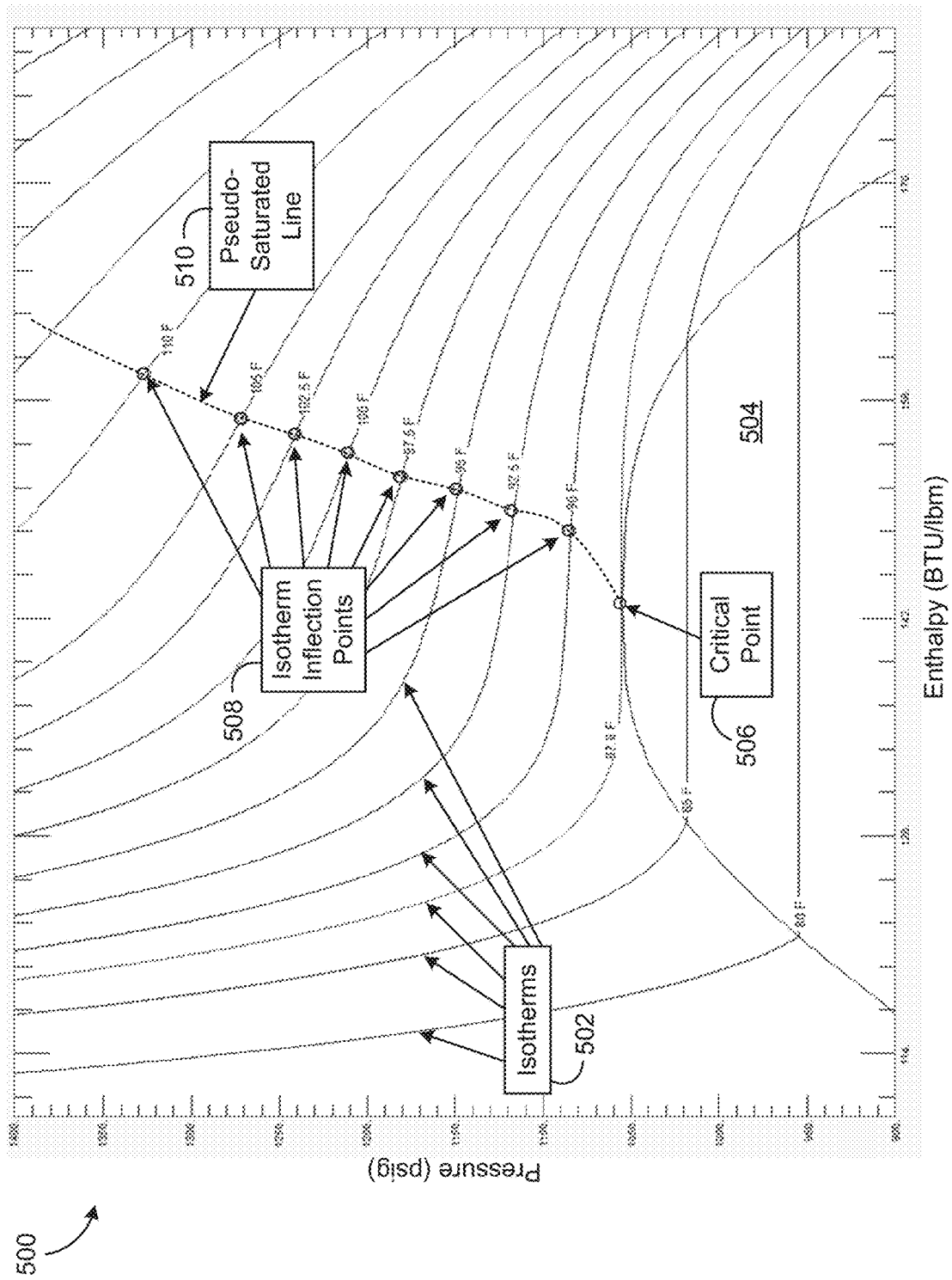

CO2 REFRIGERATION SYSTEM WITH SUPERCRITICAL SUBCOOLING CONTROL

BACKGROUND

The present disclosure relates generally to a refrigeration system and more particularly to a refrigeration system that uses carbon dioxide (i.e., $CO_2$) as a refrigerant. The present disclosure relates more particularly still to a $CO_2$ refrigeration system that controls an amount of subcooling of a $CO_2$ refrigerant.

Refrigeration systems are often used to provide cooling to temperature controlled display devices (e.g. cases, merchandisers, etc.) in supermarkets and other similar facilities. Vapor compression refrigeration systems are a type of refrigeration system which provides such cooling by circulating a fluid refrigerant (e.g., a liquid and/or vapor) through a thermodynamic vapor compression cycle. In a vapor compression cycle, the refrigerant is typically compressed to a high temperature high pressure state (e.g., by a compressor of the refrigeration system), cooled/condensed to a lower temperature state (e.g., by rejecting heat to ambient air or another fluid in a gas cooler or condenser), expanded to a lower pressure (e.g., through an expansion valve), and evaporated to provide cooling by absorbing heat into the refrigerant. $CO_2$ refrigeration systems are a type of vapor compression refrigeration system that use $CO_2$ as a refrigerant.

Heat absorption and heat rejection are two of the four thermodynamic paths that make up the vapor compression cycle. Both heat absorption and heat rejection take advantage of latent heat transfer, causing a refrigerant to change state from a saturated liquid to saturated vapor (i.e., evaporation) or from a saturated vapor to a saturated liquid (i.e., condensation). As heat is absorbed or rejected during evaporation and condensation, the pressure and the temperature may remain constant (this may not be the case if the refrigerant is a blend of refrigerants that exhibit different saturation characteristics). Any heat transfer that occurs outside of this phase changing process is known as sensible heat transfer and results in a change in temperature of the refrigerant. Sensible heat transfer can be defined as either a subcooling of liquid or a superheating of gas. When pressure is constant and the temperature of a refrigerant decreases below its saturated temperature at that pressure, its subcooling value increases. Likewise, when pressure is constant and the temperature of the refrigerant increases above its saturation temperature at that pressure, its superheating value increases. Alternatively, if the temperature remains constant, subcooling and superheating can be achieved by either increasing the pressure of the refrigerant above its saturation pressure at that temperature or decreasing the pressure of the refrigerant below its saturation pressure at that temperature, respectively. Some refrigeration systems seek to achieve a subcooling setpoint by increasing the pressure of a refrigerant to be greater than its saturation pressure. However, a refrigerant not in a subcritical region (i.e., having a temperature above the critical temperature of the refrigerant) does not have the capability of latent heat transfer (condensing or evaporating) and thus cannot be condensed isothermally by increasing its pressure. Therefore a refrigerant having a temperature greater than its critical temperature has no corresponding saturation pressure. For this reason, it is common for non-subcooling control schemes (such as methods to maximize system COP) to be implemented to control the high side of supercritical vapor compression cycle systems.

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art and is not admitted to be prior art by inclusion in this section.

SUMMARY

One implementation of the present disclosure is a refrigeration system. The refrigeration system includes a gas cooler/condenser configured to remove heat from a refrigerant and discharge the refrigerant into a high pressure conduit, a temperature sensor located along the high pressure conduit and configured to measure a temperature of the refrigerant leaving the gas cooler/condenser, a pressure sensor located along the high pressure conduit and configured to measure a pressure of the refrigerant leaving the gas cooler/condenser, a pressure control valve located along the high pressure conduit and operable to regulate the pressure of the refrigerant leaving the gas cooler/condenser, and a controller. The controller is configured to determine whether the refrigerant leaving the gas cooler/condenser is in a subcritical region based on at least one of the measured temperature or the measured pressure of the refrigerant. In response to determining that the refrigerant leaving the gas cooler/condenser is not in the subcritical region, the controller is configured to add a pseudo-subcooling temperature value to the measured temperature of the refrigerant to calculate a summed temperature, calculate a supercritical pseudo-saturated pressure as a function of the summed temperature, and operate the pressure control valve to drive the pressure of the refrigerant leaving the gas cooler/condenser to the supercritical pseudo-saturated pressure corresponding to the summed temperature.

In some embodiments, the controller is configured to generate a supercritical pseudo-saturation function for the refrigerant using supercritical pressure (P), enthalpy (H), and temperature (T) data for the refrigerant and calculate the supercritical pseudo-saturated pressure using the supercritical pseudo-saturation function.

In some embodiments, wherein the controller is configured to generate the supercritical pseudo-saturation function by identifying inflection points of supercritical P-H isotherms for the refrigerant using the supercritical P-H-T data for the refrigerant and deriving the supercritical pseudo-saturation function from the inflection points of the supercritical isotherms.

In some embodiments, deriving the supercritical pseudo-saturation function from the inflection points of the supercritical isotherms includes fitting a supercritical pseudo-saturated line to the inflection points of the supercritical isotherms. In some embodiments, deriving the supercritical pseudo-saturation function from the inflection points of the supercritical isotherms includes deriving an equation that defines the supercritical pseudo-saturated line. In some embodiments, the supercritical pseudo-saturated line is continuous with a subcritical saturation curve (on a pressure-temperature plot), as shown in FIG. 5B.

In some embodiments, the pseudo-subcooling temperature value is a dynamic value and the controller is configured to calculate the dynamic pseudo-subcooling temperature value as a function of the measured temperature of the refrigerant leaving the gas cooler/condenser. In some embodiments, the dynamic pseudo-subcooling temperature values and/or the slope of the function that yields such values are modifiable to allow for different dynamic pseudo-subcooling temperature values, as may be desired in various implementations.

In some embodiments, in response to determining that the refrigerant leaving the gas cooler/condenser is in the subcritical region, the controller is configured to add a fixed temperature value to the measured temperature of the refrigerant to calculate a second summed temperature, calculate a subcritical saturated pressure as a function of the second summed temperature, and operate the pressure control valve to drive the pressure of the refrigerant leaving the gas cooler/condenser to the subcritical saturated pressure corresponding to the second summed temperature.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 5A is another P-H diagram showing inflection points of the isotherms of the $CO_2$ refrigerant and a pseudo-saturated line passes through or best fits the inflection points of the isotherms, according to an exemplary embodiment.

DETAILED DESCRIPTION $CO_2$ Refrigeration System

Referring generally to the FIGURES, a $CO_2$ refrigeration system is shown, according to various exemplary embodiments. The $CO_2$ refrigeration system may be a vapor compression refrigeration system which uses primarily carbon dioxide (i.e., $CO_2$) as a refrigerant. In some implementations, the $CO_2$ refrigeration system is used to provide cooling for temperature controlled display devices in a supermarket or other similar facility.

Figure 1:
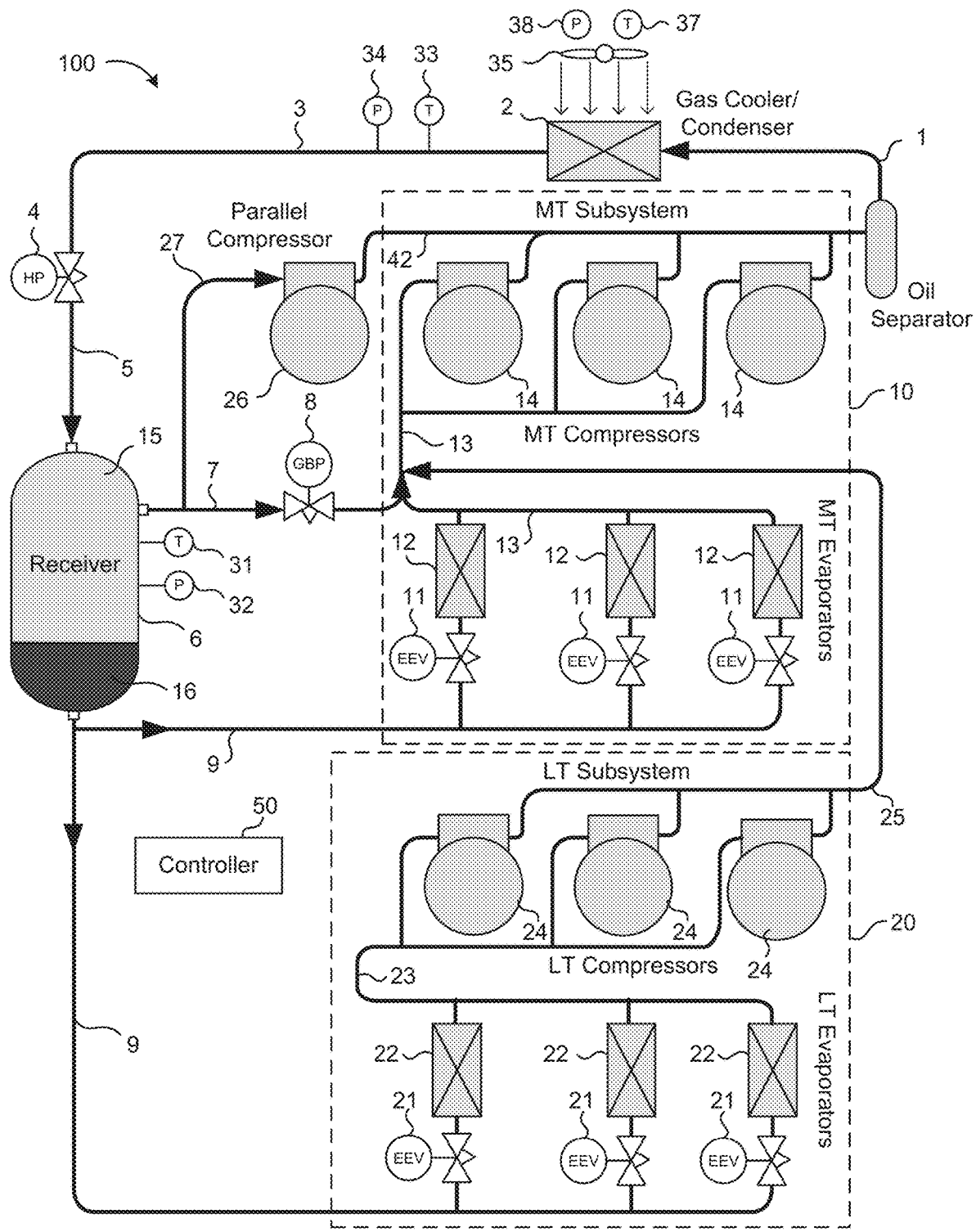
FIG. 1 is a block diagram of a $CO_2$ refrigeration system, according to an exemplary embodiment.

Referring now to FIG. 1, a $CO_2$ refrigeration system 100 is shown, according to an exemplary embodiment. $CO_2$ refrigeration system 100 may be a vapor compression refrigeration system which uses primarily carbon dioxide ($CO_2$) as a refrigerant. However, it is contemplated that other refrigerants can be substituted for $CO_2$ without departing from the teachings of the present disclosure. $CO_2$ refrigeration system 100 and is shown to include a system of pipes, conduits, or other fluid channels (e.g., fluid conduits 1, 3, 5, 7, 9, 13, 23, 25, 27, and 42) for transporting the $CO_2$ refrigerant between various components of $CO_2$ refrigeration system 100. The components of $CO_2$ refrigeration system 100 are shown to include a gas cooler/condenser 2, a high pressure valve 4, a receiver 6, a gas bypass valve 8, a medium-temperature ("MT") subsystem 10, and a low-temperature ("LT") subsystem 20. In some embodiments, $CO_2$ refrigeration system 100 includes a parallel compressor 26 which may replace high pressure valve 4 or work in parallel with high pressure valve 4. Parallel compressor 26 may be implemented with an ejector or without the ejector. Both parallel compressor 26 and the ejector are described in greater detail below.

Gas cooler/condenser 2 may be a heat exchanger or other similar device for removing heat from the $CO_2$ refrigerant. Gas cooler/condenser 2 is shown receiving $CO_2$ gas from fluid conduit 1. In some embodiments, the $CO_2$ gas in fluid conduit 1 may have a pressure within a range from approximately 45 bar to approximately 100 bar (i.e., about 650 psig to about 1450 psig), depending on ambient temperature and other operating conditions. In some embodiments, gas cooler/condenser 2 may partially or fully condense $CO_2$ gas into liquid $CO_2$ (e.g., if system operation is in a subcritical region). The condensation process may result in fully saturated $CO_2$ liquid or a two-phase liquid-vapor mixture (e.g., having a thermodynamic vapor quality between 0 and 1). In other embodiments, gas cooler/condenser 2 may cool the $CO_2$ gas (e.g., by removing only sensible heat) without condensing the $CO_2$ gas into $CO_2$ liquid (e.g., if system operation is in a supercritical region). In some embodiments, the cooling/condensation process may be assumed to be an isobaric process. Gas cooler/condenser 2 is shown outputting the cooled and/or condensed $CO_2$ refrigerant into fluid conduit 3.

In some embodiments, $CO_2$ refrigeration system 100 includes a temperature sensor 33 and a pressure sensor 34 configured to measure the temperature and pressure of the $CO_2$ refrigerant exiting gas cooler/condenser 2. Sensors 33 and 34 can be installed along fluid conduit 3 (as shown in FIG. 1), within gas cooler/condenser 2, or otherwise positioned to measure the temperature and pressure of the $CO_2$ refrigerant exiting gas cooler/condenser 2. In some embodiments, $CO_2$ refrigeration system 100 includes a condenser fan 35 configured to provide airflow across gas cooler/condenser 2. The speed of condenser fan 35 can be controlled to increase or decrease the airflow across gas cooler/condenser 2 to modulate the amount of cooling applied to the $CO_2$ refrigerant within gas cooler/condenser 2. In some embodiments, $CO_2$ refrigeration system 100 also includes a temperature sensor 37 and/or a pressure sensor 38 configured to measure the temperature and/or pressure of the ambient air that flows across gas cooler/condenser 2 to provide cooling for the $CO_2$ refrigerant contained therein.

High pressure valve 4 receives the cooled and/or condensed $CO_2$ refrigerant from fluid conduit 3 and outputs the $CO_2$ refrigerant to fluid conduit 5. High pressure valve 4 can be operated to control the high side pressure of the $CO_2$ refrigerant (i.e., the pressure of the $CO_2$ refrigerant in fluid conduit 1, gas cooler/condenser 2, and/or fluid conduit 3) by adjusting an amount of $CO_2$ refrigerant permitted to pass through high pressure valve 4. High pressure valve 4 can be operated automatically (e.g., by a controller 50) to control the high side pressure of the $CO_2$ refrigerant. In some embodiments, $CO_2$ refrigeration system 100 includes an ejector in place of high pressure valve 4 or in parallel with high pressure valve 4. Like high pressure valve 4, the ejector can be operated automatically (e.g., by controller 50) to control the high side pressure of the $CO_2$ refrigerant. In some embodiments, controller 50 receives measurements of the temperature and/or pressure of the $CO_2$ refrigerant exiting gas cooler/condenser 2 from sensors 33-34. Controller 50 can calculate an appropriate high side pressure setpoint for the $CO_2$ refrigerant and can operate high pressure valve 4 to achieve the high side pressure setpoint within fluid conduit 1, gas cooler/condenser 2, and/or fluid conduit 3. The high side pressure control performed by controller 50 is described in greater detail with reference to FIGS. 2-7.

In some embodiments, high pressure valve 4 is a high pressure thermal expansion valve (e.g., if the pressure in fluid conduit 3 is greater than the pressure in fluid conduit 5). In such embodiments, high pressure valve 4 may allow the $CO_2$ refrigerant to expand to a lower pressure state. The expansion process may be an isenthalpic and/or adiabatic expansion process, resulting in a two-phase flash of the high pressure $CO_2$ refrigerant to a lower pressure, lower temperature state. The expansion process may produce a liquid/vapor mixture (e.g., having a thermodynamic vapor quality between 0 and 1). In some embodiments, the $CO_2$ refrigerant expands to a pressure of approximately 38 bar (e.g., about 550 psig), which corresponds to a temperature of approximately 40° F. The $CO_2$ refrigerant then flows from fluid conduit 5 into receiver 6.

Receiver 6 collects the $CO_2$ refrigerant from fluid conduit 5. In some embodiments, receiver 6 may be a flash tank or other fluid reservoir. Receiver 6 includes a $CO_2$ liquid portion 16 and a $CO_2$ vapor portion 15 and may contain a partially saturated mixture of $CO_2$ liquid and $CO_2$ vapor. In some embodiments, receiver 6 separates the $CO_2$ liquid from the $CO_2$ vapor. The $CO_2$ liquid may exit receiver 6 through fluid conduits 9. Fluid conduits 9 may be liquid headers leading to MT subsystem 10 and/or LT subsystem 20. The $CO_2$ vapor may exit receiver 6 through fluid conduit 7. Fluid conduit 7 is shown leading the $CO_2$ vapor to a gas bypass valve 8 and a parallel compressor 26 (described in greater detail below). In some embodiments, $CO_2$ refrigeration system 100 includes a temperature sensor 31 and a pressure sensor 32 configured to measure the temperature and pressure within receiver 6. Sensors 31 and 32 can be installed in or on receiver 6 (as shown in FIG. 1) or along any of the fluid conduits that contain $CO_2$ refrigerant at the same temperature and/or pressure as receiver 6 (i.e., fluid conduits 5, 7, 9, or 27).

Still referring to FIG. 1, MT subsystem 10 is shown to include one or more expansion valves 11, one or more MT evaporators 12, and one or more MT compressors 14. In various embodiments, any number of expansion valves 11, MT evaporators 12, and MT compressors 14 may be present. Expansion valves 11 may be electronic expansion valves or other similar expansion valves. Expansion valves 11 are shown receiving liquid $CO_2$ refrigerant from fluid conduit 9 and outputting the $CO_2$ refrigerant to MT evaporators 12. Expansion valves 11 may cause the $CO_2$ refrigerant to undergo a rapid drop in pressure, thereby expanding the $CO_2$ refrigerant to a lower pressure, lower temperature two-phase state. In some embodiments, expansion valves 11 may expand the $CO_2$ refrigerant to a pressure of approximately 25 bar-33 bar and a temperature of approximately 13° F.-30° F. The expansion process may be an isenthalpic and/or adiabatic expansion process.

MT evaporators 12 are shown receiving the cooled and expanded $CO_2$ refrigerant from expansion valves 11. In some embodiments, MT evaporators may be associated with display cases/devices (e.g., if $CO_2$ refrigeration system 100 is implemented in a supermarket setting). MT evaporators 12 may be configured to facilitate the transfer of heat from the display cases/devices into the $CO_2$ refrigerant. The added heat may cause the $CO_2$ refrigerant to evaporate partially or completely. According to one embodiment, the $CO_2$ refrigerant is fully evaporated in MT evaporators 12. In some embodiments, the evaporation process may be an isobaric process. MT evaporators 12 are shown outputting the $CO_2$ refrigerant via suction line 13, leading to MT compressors 14.

MT compressors 14 compress the $CO_2$ refrigerant into a superheated gas having a pressure within a range of approximately 45 bar to approximately 100 bar. The output pressure from MT compressors 14 may vary depending on ambient temperature and other operating conditions. In some embodiments, MT compressors 14 operate in a transcritical mode. In operation, the $CO_2$ discharge gas exits MT compressors 14 and flows through fluid conduit 1 into gas cooler/condenser 2.

Still referring to FIG. 1, LT subsystem 20 is shown to include one or more expansion valves 21, one or more LT evaporators 22, and one or more LT compressors 24. In various embodiments, any number of expansion valves 21, LT evaporators 22, and LT compressors 24 may be present. In some embodiments, LT subsystem 20 may be omitted and the $CO_2$ refrigeration system 100 may operate with an AC module or parallel compressor 26 interfacing with only MT subsystem 10.

Expansion valves 21 may be electronic expansion valves or other similar expansion valves. Expansion valves 21 are shown receiving liquid $CO_2$ refrigerant from fluid conduit 9 and outputting the $CO_2$ refrigerant to LT evaporators 22. Expansion valves 21 may cause the $CO_2$ refrigerant to undergo a rapid drop in pressure, thereby expanding the $CO_2$ refrigerant to a lower pressure, lower temperature two-phase state. The expansion process may be an isenthalpic and/or adiabatic expansion process. In some embodiments, expansion valves 21 may expand the $CO_2$ refrigerant to a lower pressure than expansion valves 11, thereby resulting in a lower temperature $CO_2$ refrigerant. Accordingly, LT subsystem 20 may be used in conjunction with a freezer system or other lower temperature display cases.

LT evaporators 22 are shown receiving the cooled and expanded $CO_2$ refrigerant from expansion valves 21. In some embodiments, LT evaporators may be associated with display cases/devices (e.g., if $CO_2$ refrigeration system 100 is implemented in a supermarket setting). LT evaporators 22 may be configured to facilitate the transfer of heat from the display cases/devices into the $CO_2$ refrigerant. The added heat may cause the $CO_2$ refrigerant to evaporate partially or completely. In some embodiments, the evaporation process may be an isobaric process. LT evaporators 22 are shown outputting the $CO_2$ refrigerant via suction line 23, leading to LT compressors 24.

LT compressors 24 compress the $CO_2$ refrigerant. In some embodiments, LT compressors 24 may compress the $CO_2$ refrigerant to a pressure of approximately 30 bar (e.g., about 450 psig) having a saturation temperature of approximately 23° F. In some embodiments, LT compressors 24 operate in a subcritical mode. LT compressors 24 are shown outputting the $CO_2$ refrigerant through discharge line 25. Discharge line 25 may be fluidly connected with the suction (e.g., upstream) side of MT compressors 14.

Still referring to FIG. 1, $CO_2$ refrigeration system 100 is shown to include a gas bypass valve 8. Gas bypass valve 8 may receive the $CO_2$ vapor from fluid conduit 7 and output the $CO_2$ refrigerant to MT subsystem 10. In some embodiments, gas bypass valve 8 is arranged in series with MT compressors 14. In other words, $CO_2$ vapor from receiver 6 may pass through both gas bypass valve 8 and MT compressors 14. MT compressors 14 may compress the $CO_2$ vapor passing through gas bypass valve 8 from a low pressure state (e.g., approximately 30 bar or lower) to a high pressure state (e.g., 45-100 bar).

Gas bypass valve 8 may be operated to regulate or control the pressure within receiver 6 (e.g., by adjusting an amount of $CO_2$ refrigerant permitted to pass through gas bypass valve 8). For example, gas bypass valve 8 may be adjusted (e.g., variably opened or closed) to adjust the mass flow rate, volume flow rate, or other flow rates of the $CO_2$ refrigerant through gas bypass valve 8. Gas bypass valve 8 may be opened and closed (e.g., manually, automatically, by a controller, etc.) as needed to regulate the pressure within receiver 6.

In some embodiments, gas bypass valve 8 includes a sensor for measuring a flow rate (e.g., mass flow, volume flow, etc.) of the $CO_2$ refrigerant through gas bypass valve 8. In other embodiments, gas bypass valve 8 includes an indicator (e.g., a gauge, a dial, etc.) from which the position of gas bypass valve 8 may be determined. This position may be used to determine the flow rate of $CO_2$ refrigerant through gas bypass valve 8, as such quantities may be proportional or otherwise related.

In some embodiments, gas bypass valve 8 may be a thermal expansion valve (e.g., if the pressure on the downstream side of gas bypass valve 8 is lower than the pressure in fluid conduit 7). According to one embodiment, the pressure within receiver 6 is regulated by gas bypass valve 8 to a pressure of approximately 38 bar, which corresponds to about 37° F. Advantageously, this pressure/temperature state may facilitate the use of copper tubing/piping for the downstream $CO_2$ lines of the system. Additionally, this pressure/temperature state may allow such copper tubing to operate in a substantially frost-free manner.

In some embodiments, the $CO_2$ vapor that is bypassed through gas bypass valve 8 is mixed with the $CO_2$ refrigerant gas exiting MT evaporators 12 (e.g., via suction line 13). The bypassed $CO_2$ vapor may also mix with the discharge $CO_2$ refrigerant gas exiting LT compressors 24 (e.g., via discharge line 25). The combined $CO_2$ refrigerant gas may be provided to the suction side of MT compressors 14.

In some embodiments, the pressure immediately downstream of gas bypass valve 8 (i.e., in suction line 13) is lower than the pressure immediately upstream of gas bypass valve 8 (i.e., in fluid conduit 7). Therefore, the $CO_2$ vapor passing through gas bypass valve 8 and MT compressors 14 may be expanded (e.g., when passing through gas bypass valve 8) and subsequently recompressed (e.g., by MT compressors 14). This expansion and recompression may occur without any intermediate transfers of heat to or from the $CO_2$ refrigerant, which can be characterized as an inefficient energy usage.

Still referring to FIG. 1, $CO_2$ refrigeration system 100 is shown to include a parallel compressor 26. Parallel compressor 26 may be arranged in parallel with MT compressors 14 and arranged in series with LT compressors 24. Although only one parallel compressor 26 is shown, any number of parallel compressors may be present. Parallel compressor 26 may be fluidly connected with receiver 6 and/or fluid conduit 7 via a connecting line 27. Parallel compressor 26 may be used to draw non-condensed $CO_2$ vapor from receiver 6 as a means for pressure control and regulation. Advantageously, using parallel compressor 26 to effectuate pressure control and regulation may provide a more efficient alternative to traditional pressure regulation techniques such as bypassing $CO_2$ vapor through bypass valve 8 to the lower pressure suction side of MT compressors 14.

In some embodiments, parallel compressor 26 may be operated (e.g., by a controller 50) to achieve a desired pressure within receiver 6. For example, controller 50 may activate or deactivate parallel compressor 26 when the flow rate of the $CO_2$ refrigerant through gas bypass valve 8 exceeds a threshold value to assist with regulating the pressure within receiver 6. Parallel compressor 26 may have a minimum flow rate requirement and may activate and remain on as long as the flow rate of the $CO_2$ refrigerant through parallel compressor 26 is at least its minimum required flow rate. When active, parallel compressor 26 compresses the $CO_2$ vapor received via connecting line 27 and discharges the compressed gas into discharge line 42. Discharge line 42 may be fluidly connected with fluid conduit 1. Accordingly, parallel compressor 26 may operate in parallel with MT compressors 14 by discharging the compressed $CO_2$ gas into a shared fluid conduit (e.g., fluid conduit 1).

Parallel compressor 26 may be arranged in parallel with both gas bypass valve 8 and with MT compressors 14. $CO_2$ vapor exiting receiver 6 may pass through either parallel compressor 26 or the series combination of gas bypass valve 8 and MT compressors 14. Parallel compressor 26 may receive the $CO_2$ vapor at a relatively higher pressure (e.g., from fluid conduit 7) than the $CO_2$ vapor received by MT compressors 14 (e.g., from suction line 13). This differential in pressure may correspond to the pressure differential across gas bypass valve 8. In some embodiments, parallel compressor 26 may require less energy to compress an equivalent amount of $CO_2$ vapor to the high pressure state (e.g., in fluid conduit 1) as a result of the higher pressure of $CO_2$ vapor entering parallel compressor 26. Therefore, the parallel route including parallel compressor 26 may be a more efficient alternative to the route including gas bypass valve 8 and MT compressors 14.

In some embodiments, gas bypass valve 8 is omitted and the pressure within receiver 6 is regulated using parallel compressor 26. In other embodiments, parallel compressor 26 is omitted and the pressure within receiver 6 is regulated using gas bypass valve 8. In other embodiments, both gas bypass valve 8 and parallel compressor 26 are used to regulate the pressure within receiver 6. All such variations are within the scope of the present disclosure.

Controller

Figure 2:
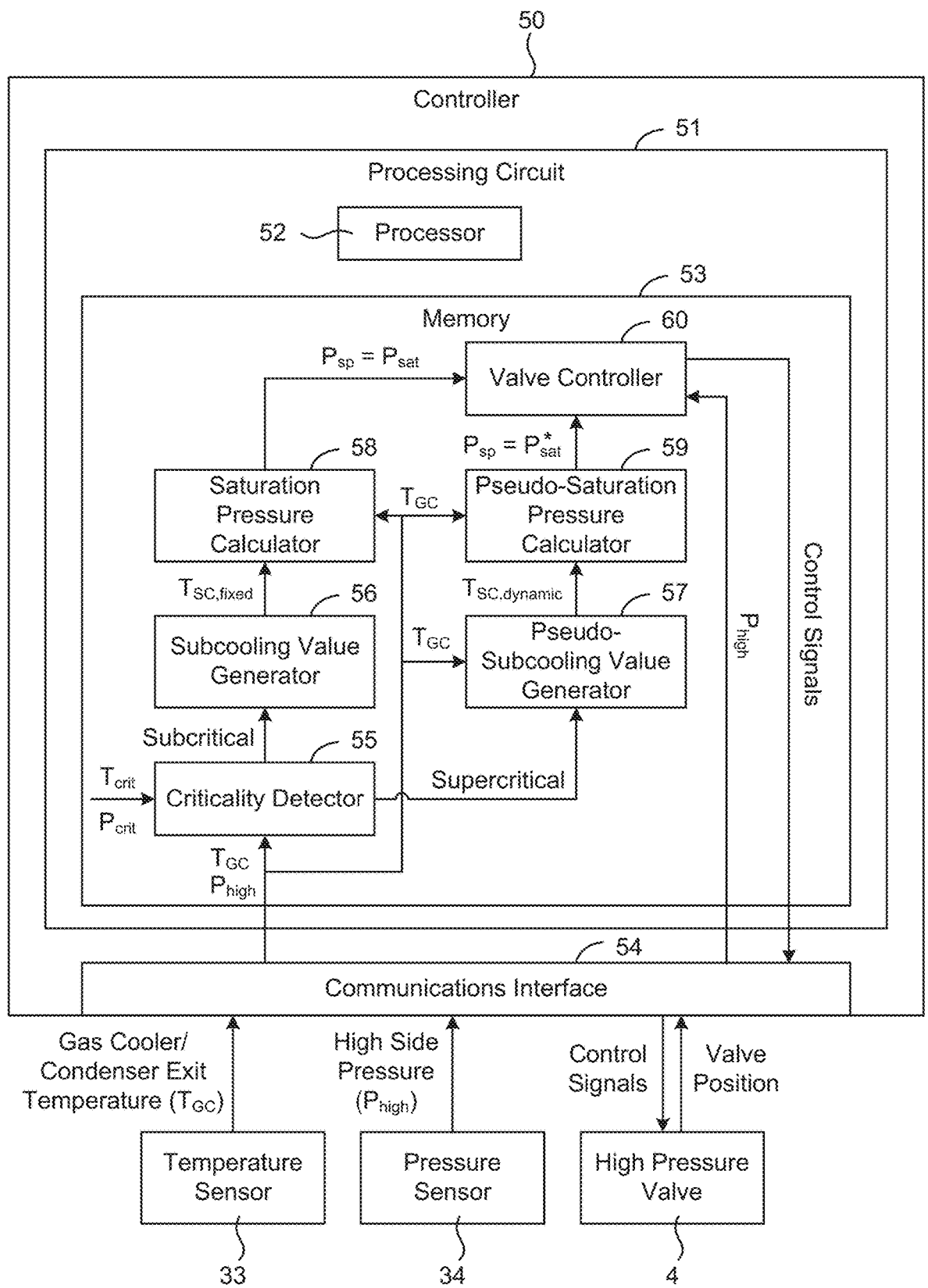
FIG. 2 is a block diagram of a controller configured to control the $CO_2$ refrigeration system of FIG. 1, according to an exemplary embodiment.

Referring now to FIG. 2, a block diagram illustrating controller 50 in greater detail is shown, according to an exemplary embodiment. Controller 50 may receive signals from one or more measurement devices (e.g., pressure sensors, temperature sensors, flow sensors, etc.) located within $CO_2$ refrigeration system 100. For example, controller 50 is shown receiving temperature and pressure measurements from sensors 33-34 and a valve position signal from high pressure valve 4. Although not explicitly shown in FIG. 2, controller 50 may also receive measurements from any of sensors 31-34 and 37-38, a fan speed signal from condenser fan 35, a valve position signal from gas bypass valve 8, and/or any other measurements or inputs from the various devices of $CO_2$ refrigeration system 100.

Controller 50 may use the input signals to determine appropriate control actions for controllable devices of $CO_2$ refrigeration system 100 (e.g., compressors 14 and 24, parallel compressor 26, condenser fan 35, valves 4, 8, 11, and 21, flow diverters, power supplies, etc.). For example, controller 50 is shown providing control signals to high pressure valve 4. Although not explicitly shown in FIG. 2, controller 50 may also provide control signals to MT compressors 14, LT compressors 24, parallel compressor 26, gas bypass valve 8, condenser fan 35, and/or any other controllable device of $CO_2$ refrigeration system 100.

In some embodiments, controller 50 is configured to operate high pressure valve 4 to maintain the high side pressure $P_{high}$ of the $CO_2$ refrigerant (i.e., the pressure measured by pressure sensor 34) at a high side pressure setpoint $P_{sp}$. Controller 50 can generate the high side pressure setpoint $P_{sp}$ to ensure that the $CO_2$ refrigerant exiting gas cooler/condenser 2 has a desired amount of subcooling. The desired amount of subcooling may vary depending on whether the $CO_2$ refrigerant exiting gas cooler/condenser 2 is in a subcritical region or a supercritical region. In some embodiments, controller 50 may compare the high side pressure $P_{high}$ of the $CO_2$ refrigerant exiting gas cooler/condenser 2 (i.e., the pressure measured by pressure sensor 34) to the critical pressure $P_{crit}$ of the $CO_2$ refrigerant to determine whether the $CO_2$ refrigerant is in a supercritical region or subcritical region. In other embodiments, controller 50 may compare the temperature $T_{GC}$ of the $CO_2$ refrigerant exiting gas cooler/condenser 2 (i.e., the temperature measured by temperature sensor 33) to the critical temperature $T_{crit}$ of the $CO_2$ refrigerant to determine whether the $CO_2$ refrigerant is in a supercritical region or subcritical region.

In some embodiments, if the high side pressure $P_{high}$ of the $CO_2$ refrigerant exiting gas cooler/condenser 2 is less than the critical pressure $P_{crit}$ (i.e., $P_{high}<P_{crit}$), controller 50 may determine that the $CO_2$ refrigerant is in a subcritical region. In other embodiments, if the temperature $T_{GC}$ of the $CO_2$ refrigerant exiting gas cooler/condenser 2 is less than the critical temperature $T_{crit}$ (i.e., $T_{GC}<T_{crit}$), controller 50 may determine that the $CO_2$ refrigerant is in a subcritical region. In response to determining that the $CO_2$ refrigerant is in a subcritical region, controller 50 may identify a predetermined or fixed subcooling value $T_{SC,fixed}$. Controller 50 may then add the fixed subcooling value $T_{SC,fixed}$ to the measured temperature $T_{GC}$ and identify a corresponding saturation pressure $P_{sat}(T_{GC}+T_{SC,fixed})$, where the function $P_{sat}(\ )$ calculates the saturation pressure $P_{sat}$ of the $CO_2$ refrigerant at a given subcritical temperature (i.e., the summed temperature $T_{GC}+T_{SC,fixed}$). Controller 50 may then set the high side pressure setpoint $P_{sp}$ equal to the calculated saturation pressure $P_{sat}$ and operate high pressure valve 4 to drive the high side pressure $P_{high}$ to the pressure setpoint $P_{sp}$.

In some embodiments, if the high side pressure $P_{high}$ of the $CO_2$ refrigerant exiting gas cooler/condenser 2 is greater than the critical pressure $P_{crit}$ (i.e., $P_{high}>P_{crit}$), controller 50 may determine that the $CO_2$ refrigerant is in a supercritical region. In other embodiments, if the temperature $T_{GC}$ of the $CO_2$ refrigerant exiting gas cooler/condenser 2 is greater than the critical temperature $T_{crit}$ (i.e., $T_{GC}>T_{crit}$), controller 50 may determine that the $CO_2$ refrigerant is in a supercritical region. In response to determining that the $CO_2$ refrigerant is in a supercritical region, controller 50 may identify a dynamic pseudo-subcooling value $T_{SC,dynamic}$ that corresponds the measured temperature $T_{GC}$. The dynamic pseudo-subcooling value $T_{SC,dynamic}$ may vary as a function of the measured temperature $T_{GC}$ as well as a user controlled modification to the dynamic pseudo-subcooling values, yielding either a lower or higher controlled pressure at any given supercritical temperature. Controller 50 may then add the dynamic pseudo-subcooling value $T_{SC,dynamic}$ to the measured temperature $T_{GC}$ and identify a corresponding pseudo-saturation pressure $P_{sat}*(T_{GC}+T_{SC,dynamic})$, where the function $P_{sat}*(\ )$ defines the pseudo-saturation pressure $P_{sat}*$ of the $CO_2$ refrigerant at a given supercritical temperature (i.e., the summed temperature $T_{GC}+T_{SC,dynamic}$). The pseudo-saturation pressure $P_{sat}*$ for supercritical temperatures and the function $P_{sat}*(\ )$ are described in greater detail below. Controller 50 may then set the high side pressure setpoint $P_{sp}$ equal to the calculated pseudo-saturation pressure $P_{sat}*$ and operate high pressure valve 4 to drive the high side pressure $P_{high}$ to the pressure setpoint $P_{sp}$.

In some embodiments, controller 50 is configured to operate gas bypass valve 8 and/or parallel compressor 26 to maintain the $CO_2$ pressure within receiving tank 6 at a desired setpoint or within a desired range. In some embodiments, controller 50 operates gas bypass valve 8 and parallel compressor 26 based on a flow rate (e.g., mass flow, volume flow, etc.) of $CO_2$ refrigerant through gas bypass valve 8. Controller 50 may use a valve position of gas bypass valve 8 as a proxy for $CO_2$ refrigerant flow rate. In some embodiments, controller 50 operates high pressure valve 4 and expansion valves 11 and 21 to regulate the flow of refrigerant in system 100.

Controller 50 may include feedback control functionality for adaptively operating the various components of $CO_2$ refrigeration system 100. For example, controller 50 may receive or generate a setpoint (e.g., a temperature setpoint, a pressure setpoint, a flow rate setpoint, a power usage setpoint, etc.) and operate one or more components of system 100 to achieve the setpoint. The setpoint may be specified by a user (e.g., via a user input device, a graphical user interface, a local interface, a remote interface, etc.) or automatically determined by controller 50 based on one or more measurements collected by the sensors of $CO_2$ refrigeration system 100. In some embodiments, controller 50 includes some or all of the features of the controller described in P.C.T. Patent Application No. PCT/US2016/044164 filed Jul. 27, 2016, the entire disclosure of which is incorporated by reference herein.

Controller 50 may be a proportional-integral (PI) controller, a proportional-integral-derivative (PID) controller, a pattern recognition adaptive controller (PRAC), a model recognition adaptive controller (MRAC), a model predictive controller (MPC), or any other type of controller employing any type of control functionality. In some embodiments, controller 50 is a local controller for $CO_2$ refrigeration system 100. In other embodiments, controller 50 is a supervisory controller for a plurality of controlled subsystems (e.g., a refrigeration system, an AC system, a lighting system, a security system, etc.). For example, controller 50 may be a controller for a comprehensive building management system incorporating $CO_2$ refrigeration system 100. Controller 50 may be implemented locally, remotely, or as part of a cloud-hosted suite of building management applications.

Still referring to FIG. 2, controller 50 is shown to include a communications interface 54 and a processing circuit 51. Communications interface 54 can be or include wired or wireless interfaces (e.g., jacks, antennas, transmitters, receivers, transceivers, wire terminals, etc.) for conducting electronic data communications. For example, communications interface 54 may be used to conduct communications with gas bypass valve 8, parallel compressor 26, compressors 14 and 24, high pressure valve 4, various data acquisition devices within $CO_2$ refrigeration system 100 (e.g., temperature sensors, pressure sensors, flow sensors, etc.) and/or other external devices or data sources. Data communications may be conducted via a direct connection (e.g., a wired connection, an ad-hoc wireless connection, etc.) or a network connection (e.g., an Internet connection, a LAN, WAN, or WLAN connection, etc.). For example, communications interface 54 can include an Ethernet card and port for sending and receiving data via an Ethernet-based communications link or network. In another example, communications interface 54 can include a Wi-Fi transceiver or a cellular or mobile phone transceiver for communicating via a wireless communications network.

In some embodiments, communications interface 54 receives a measurement of a gas cooler/condenser exit temperature $T_{GC}$ from temperature sensor 33 and a measurement of the high side pressure $P_{high}$ from pressure sensor 34. The gas cooler/condenser exit temperature $T_{GC}$ may indicate the temperature of the $CO_2$ refrigerant at the outlet of gas cooler/condenser 2, whereas the high side pressure $P_{high}$ may indicate the pressure of the $CO_2$ refrigerant at the outlet of gas cooler/condenser 2. If the cooling/condensation of the $CO_2$ refrigerant within gas cooler/condenser 2 is isobaric, the high side pressure $P_{high}$ may also be the pressure of the $CO_2$ refrigerant within the high side components of $CO_2$ refrigeration system 100 (i.e., fluid conduit 1, gas cooler/condenser 2, and/or fluid conduit 3). Communications interface 54 may also receive a valve position signal from high pressure valve 4. Communications interface 54 may provide control signals to high pressure valve 4 (e.g., to an electromechanical actuator that operates high pressure valve 4) to drive the high side pressure $P_{high}$ of the $CO_2$ refrigerant to a high side pressure setpoint.

Processing circuit 51 is shown to include a processor 52 and memory 53. Processor 52 can be implemented as a general purpose processor, an application specific integrated circuit (ASIC), one or more field programmable gate arrays (FPGAs), a group of processing components, a microcontroller, or other suitable electronic processing components. Memory 53 (e.g., memory device, memory unit, storage device, etc.) may be one or more devices (e.g., RAM, ROM, solid state memory, hard disk storage, etc.) for storing data and/or computer code for completing or facilitating the various processes, layers and modules described in the present application. Memory 53 may be or include volatile memory or non-volatile memory. Memory 53 may include database components, object code components, script components, or any other type of information structure for supporting the various activities and information structures described in the present application. According to an exemplary embodiment, memory 53 is communicably connected to processor 52 via processing circuit 51 and includes computer code for executing (e.g., by processing circuit 51 and/or processor 52) one or more processes or control features described herein.

Still referring to FIG. 2, controller 50 is shown to include a criticality detector 55. Criticality detector 55 can be configured to determine whether the $CO_2$ refrigerant leaving gas cooler/condenser 2 is in a subcritical region or supercritical region. In some embodiments, criticality detector 55 may receive the measured pressure $P_{high}$ of the $CO_2$ refrigerant exiting gas cooler/condenser 2 and may compare the measured pressure $P_{high}$ with the critical pressure $P_{crit}$ of the $CO_2$ refrigerant. The critical pressure $P_{crit}$ is a known constant and may be stored as a fixed value within memory 53. If the pressure $P_{high}$ of the $CO_2$ refrigerant exiting gas cooler/condenser 2 is less than the critical pressure $P_{crit}$ (i.e., $P_{high}<P_{crit}$) criticality detector 55 may determine that the $CO_2$ refrigerant is in a subcritical region. However, if the pressure $P_{high}$ of the $CO_2$ refrigerant exiting gas cooler/condenser 2 is greater than the critical pressure $P_{crit}$ (i.e., $P_{high}>P_{crit}$), criticality detector 55 may determine that the $CO_2$ refrigerant is in a supercritical region.

In other embodiments, criticality detector 55 may receive the measured temperature $T_{GC}$ of the $CO_2$ refrigerant exiting gas cooler/condenser 2 and may compare the measured temperature $T_{GC}$ with the critical temperature $T_{crit}$ of the $CO_2$ refrigerant. The critical temperature $T_{crit}$ is a known constant and may be stored as a fixed value within memory 53. If the temperature $T_{GC}$ of the $CO_2$ refrigerant exiting gas cooler/condenser 2 is less than the critical temperature $T_{crit}$ (i.e., $T_{GC}<T_{crit}$), criticality detector 55 may determine that the $CO_2$ refrigerant is in a subcritical region. However, if the temperature $T_{GC}$ of the $CO_2$ refrigerant exiting gas cooler/condenser 2 is greater than the critical temperature $T_{crit}$ (i.e., $T_{GC}>T_{crit}$), criticality detector 55 may determine that the $CO_2$ refrigerant is in a supercritical region.

In response to determining that the $CO_2$ refrigerant is in a subcritical region, criticality detector 55 may trigger subcooling value generator 56 and saturation pressure calculator 58 to generate the pressure setpoint $P_{sp}$. Subcooling value generator 56 may identify a predetermined or fixed subcooling value $T_{SC,fixed}$ and may provide the fixed subcooling value $T_{SC,fixed}$ to saturation pressure calculator 58. The fixed subcooling value $T_{SC,fixed}$ can be stored in memory 53, specified by a user, and/or received from an external data source.

Saturation pressure calculator 58 may add the fixed subcooling value $T_{SC,fixed}$ to the measured temperature $T_{GC}$ and may identify a saturation pressure $P_{sat}$ that corresponds to the summed temperature $T_{GC}+T_{SC,fixed}$. In some embodiments, saturation pressure calculator 58 uses a function $P_{sat}(T_{GC}+T_{SC,fixed})$ to calculate the saturation pressure $P_{sat}$ as a function of the summed temperature $T_{GC}+T_{SC,fixed}$. The function $P_{sat}(\ )$ may define the saturation pressure $P_{sat}$ of the $CO_2$ refrigerant as a function of temperature. In other embodiments, saturation pressure calculator 58 uses a lookup table that defines pairs of saturation pressures and corresponding saturation temperatures of the $CO_2$ refrigerant and interpolates within the lookup table to calculate the saturation pressure $P_{sat}$ as a function of the summed temperature $T_{GC}+T_{SC,fixed}$.

Saturation pressure calculator 58 may then set the high side pressure setpoint $P_{sp}$ equal to the calculated saturation pressure $P_{sat}$. By setting the high side pressure setpoint $P_{sp}$ equal to the calculated saturation pressure $P_{sat}$, saturation pressure calculator 58 ensures that the $CO_2$ refrigerant has the desired amount of subcooling (i.e., $T_{SC,fixed}$) at the exit of gas cooler/condenser 2. For example, the saturation temperature of the $CO_2$ refrigerant at the calculated saturation pressure $P_{sat}$ is equal to the summed temperature $T_{GC}+T_{SC,fixed}$. Because the actual temperature of the $CO_2$ refrigerant at the exit of gas cooler/condenser 2 is $T_{GC}$, the difference between the actual temperature and the saturation temperature is $T_{SC,fixed}$. In other words, the $CO_2$ refrigerant is subcooled by the desired amount $T_{SC,fixed}$.

Figure 8:
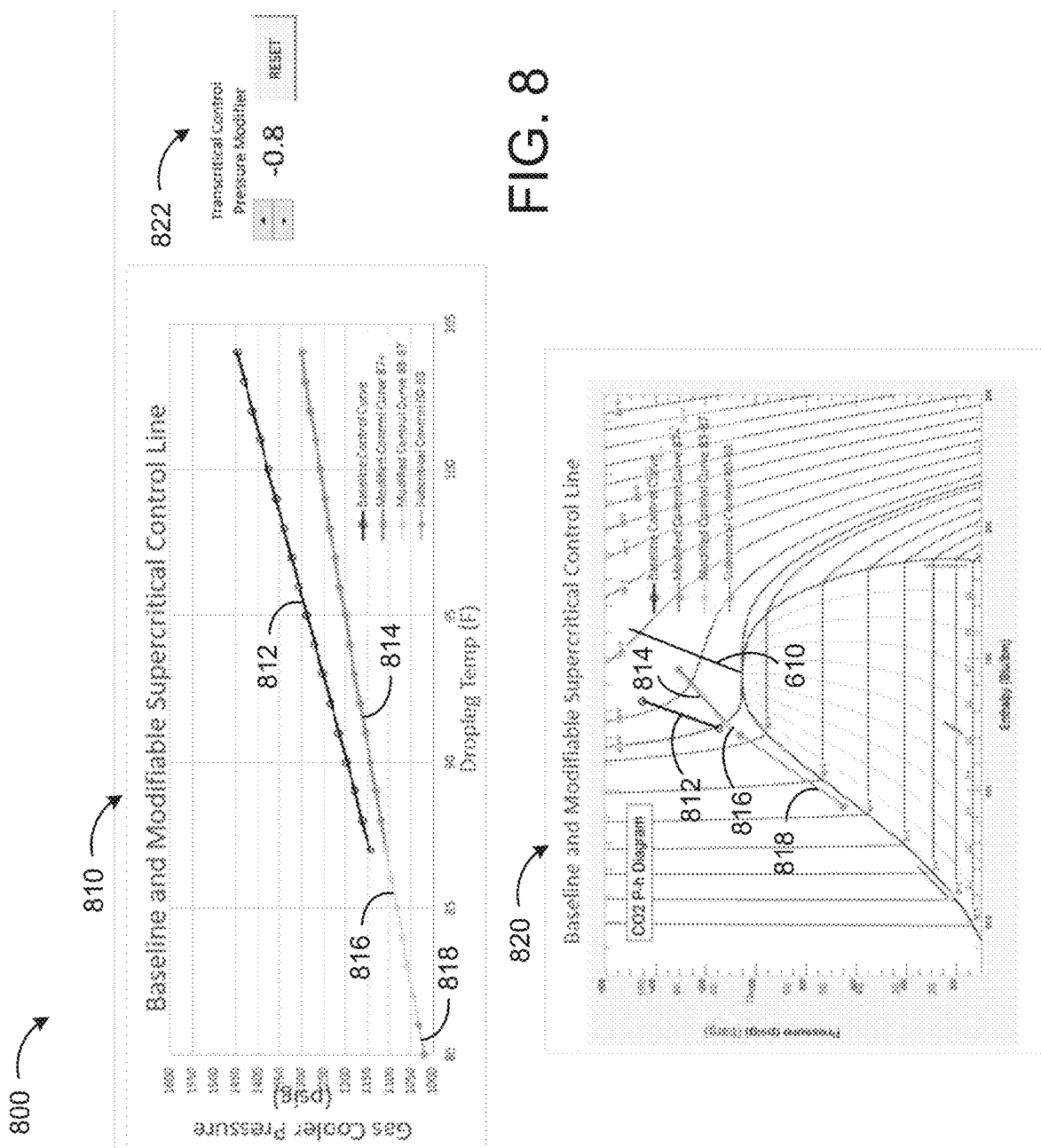
FIG. 8 is a drawing which illustrates how a user might adjust dynamic pseudo-subcooling temperature values of the $CO_2$ refrigerant, according to an exemplary embodiment.

In response to determining that the $CO_2$ refrigerant is in a supercritical region, criticality detector 55 may trigger pseudo-subcooling value generator 57 and pseudo-saturation pressure calculator 59 to generate the pressure setpoint $P_{sp}$. Pseudo-subcooling value generator 57 may identify a dynamic pseudo-subcooling value $T_{SC,dynamic}$ that corresponds the measured temperature $T_{GC}$. The dynamic pseudo-subcooling value $T_{SC,dynamic}$ may vary as a function of the measured temperature $T_{GC}$. In some embodiments, the dynamic pseudo-subcooling value $T_{SC,dynamic}$ is relatively larger at higher values of the measured temperature $T_{GC}$ and relatively smaller at lower values of the measured temperature $T_{GC}$. In other embodiments, the dynamic pseudo-subcooling value $T_{SC,dynamic}$ is relatively smaller at higher values of the measured temperature $T_{GC}$ and relatively larger at lower values of the measured temperature $T_{GC}$. The function that defines the dynamic pseudo-subcooling values $T_{SC,dynamic}$ as a function of the measured temperature $T_{GC}$ can be adjusted (e.g., by a user) to control the relationship between the dynamic pseudo-subcooling values $T_{SC,dynamic}$ and the temperature $T_{GC}$. For example, a user can provide input to controller 50 (as shown in FIG. 8) and can adjust a slope of a supercritical control line to adjust whether the dynamic pseudo-subcooling values $T_{SC,dynamic}$ increase, decrease, or remain constant as the measured temperature $T_{GC}$ increases. Pseudo-subcooling value generator 57 may calculate $T_{SC,dynamic}$ as a function of $T_{GC}$ and provide the calculated value of $T_{SC,dynamic}$ to pseudo-saturation pressure calculator 59.

Pseudo-saturation pressure calculator 59 may add the dynamic pseudo-subcooling value $T_{SC,dynamic}$ to the measured temperature $T_{GC}$ and may identify a pseudo-saturation pressure $P_{sat}^*$ that corresponds to the summed temperature $T_{GC}+T_{SC,dynamic}$. In some embodiments, pseudo-saturation pressure calculator 59 uses a function $P_{sat}^*(T_{GC}+T_{SC,dynamic})$ to calculate the pseudo-saturation pressure $P_{sat}^*$ as a function of the summed temperature $T_{GC}+T_{SC,dynamic}$. The function $P_{sat}^*( )$ may define the pseudo-saturation pressure $P_{sat}^*$ of the $CO_2$ refrigerant as a function of temperature. In other embodiments, pseudo-saturation pressure calculator 59 uses a lookup table that defines pairs of pseudo-saturation pressures and corresponding supercritical temperatures of the $CO_2$ refrigerant and interpolates within the lookup table to calculate the pseudo-saturation pressure $P_{sat}^*$ as a function of the summed temperature $T_{GC}+T_{SC,dynamic}$. The pseudo-saturation pressure $P_{sat}^*$ for supercritical temperatures and the function $P_{sat}^*( )$ are described in greater detail with reference to FIG. 3.

Pseudo-saturation pressure calculator 59 may then set the high side pressure setpoint $P_{sp}$ equal to the calculated pseudo-saturation pressure $P_{sat}^*$. By setting the high side pressure setpoint $P_{sp}$ equal to the calculated pseudo-saturation pressure $P_{sat}^*$, pseudo-saturation pressure calculator 59 ensures that the $CO_2$ refrigerant has the desired amount of pseudo-subcooling (i.e., $T_{SC,dynamic}$) at the exit of gas cooler/condenser 2. For example, the pseudo-saturation temperature of the $CO_2$ refrigerant at the calculated pseudo-saturation pressure $P_{sat}^*$ is equal to the summed temperature $T_{cc}+T_{SC,dynamic}$. Because the actual temperature of the $CO_2$ refrigerant at the exit of gas cooler/condenser 2 is $T_{GC}$, the difference between the actual temperature and the pseudo-saturation temperature is $T_{SC,dynamic}$. In other words, the $CO_2$ refrigerant is subcooled by the desired amount $T_{SC,dynamic}$.

Still referring to FIG. 2, controller 50 is shown to include a valve controller 60. Valve controller 60 may receive the pressure setpoint $P_{sp}$ from saturation pressure calculator 58 or pseudo-saturation pressure calculator 59, depending on whether the $CO_2$ refrigerant is in a subcritical region or supercritical region exiting gas cooler/condenser 2. Valve controller 60 may also receive the high side pressure $P_{high}$ measured by pressure sensor 34. Valve controller 60 can operate high pressure valve 4 using any of a variety of feedback control techniques (e.g., PID, PI, MPC, etc.) to drive the measured high side pressure $P_{high}$ to the pressure setpoint $P_{sp}$. For example, valve controller 60 is shown providing control signals to high pressure valve 4. The control signals may cause high pressure valve 4 to variably open or close to adjust the flowrate of the $CO_2$ refrigerant through high pressure valve 4, thereby affecting the high side pressure $P_{high}$ upstream of high pressure valve 4. In some embodiments, valve controller 60 causes high pressure valve 4 to open more to decrease the high side pressure $P_{high}$ (i.e., if the high side pressure $P_{high}$ is greater than the pressure setpoint $P_{sp}$) and causes high pressure valve 4 to close more to increase the high side pressure $P_{high}$ (i.e., if the high side pressure $P_{high}$ is less than the pressure setpoint $P_{sp}$).

Pseudo-Saturation Pressure Calculator

Figure 3:
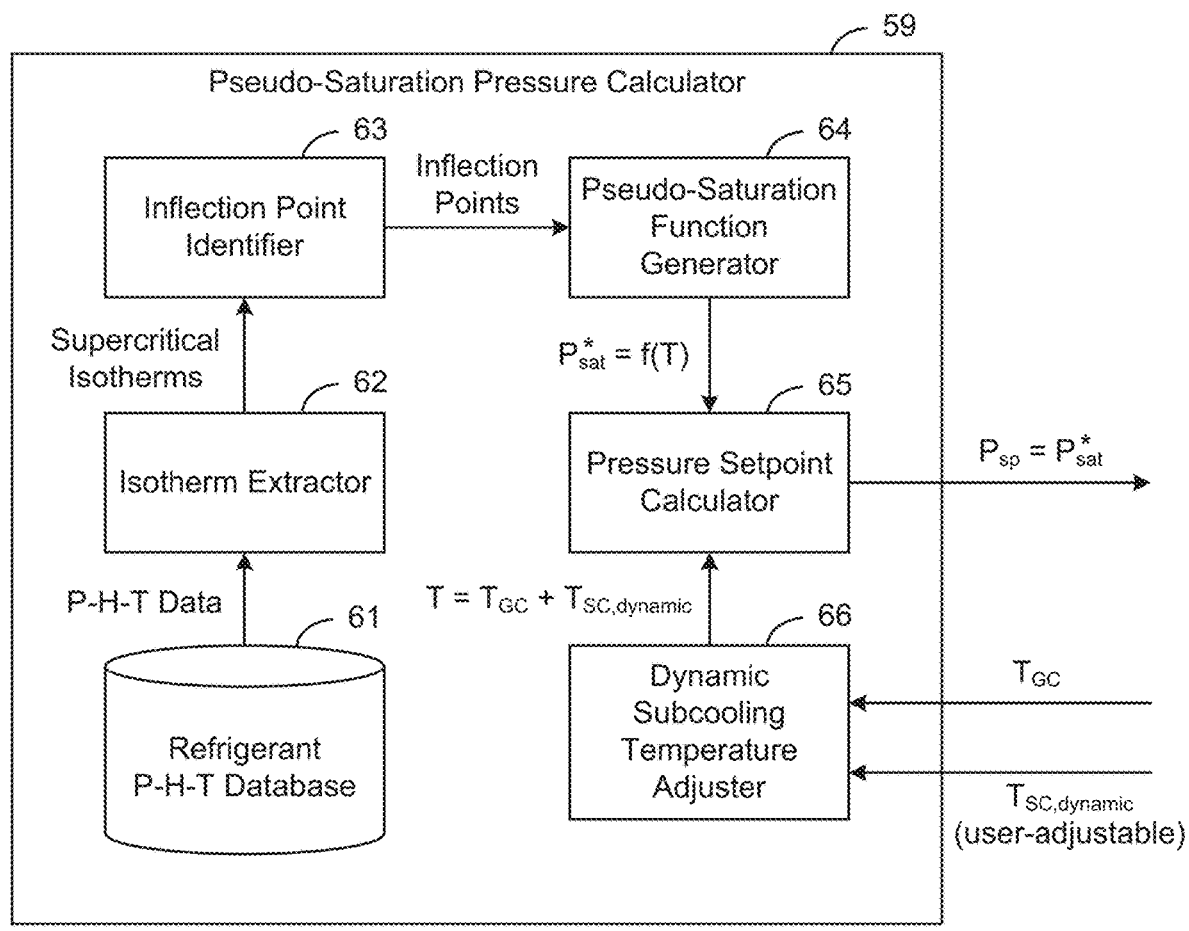
FIG. 3 is a block diagram illustrating a pseudo-saturation pressure calculator component of the controller of FIG. 2 in greater detail, according to an exemplary embodiment.

Referring now to FIG. 3, a block diagram illustrating pseudo-saturation pressure calculator 59 in greater detail is shown, according to an exemplary embodiment. As described above, pseudo-saturation pressure calculator 59 can be configured to calculate a pseudo-saturation pressure $P_{sat}^*$ of the $CO_2$ refrigerant at various supercritical temperatures. When the measured pressure of the $CO_2$ refrigerant $P_{high}$ exceeds the supercritical pressure $P_{crit}$ and/or the measured temperature of the $CO_2$ refrigerant $T_{GC}$ exceeds the supercritical temperature $T_{crit}$, pseudo-saturation pressure calculator 59 can add the desired amount of pseudo-subcooling $T_{SC,dynamic}$ to the measured temperature $T_{GC}$ and calculate the corresponding pseudo-saturation pressure $P_{sat}^*(T_{GC}+T_{SC,dynamic})$. Pseudo-saturation pressure calculator 59 can then set the pressure setpoint $P_{sp}$ to the calculated pseudo-saturation pressure $P_{sat}^*$ to ensure that the $CO_2$ refrigerant has the desired amount of pseudo-subcooling $T_{SC,dynamic}$. The components of pseudo-saturation pressure calculator 59 and steps performed by pseudo-saturation pressure calculator 59 to calculate the pseudo-saturation pressure $P_{sat}^*$ are described in detail below.

Pseudo-saturation pressure calculator 59 is shown to include a refrigerant pressure (P), enthalpy (H), and temperature (T) database 61. P-H-T database 61 may store data defining various potential states of the $CO_2$ refrigerant. Each potential state of the $CO_2$ refrigerant may have a corresponding pressure value, a corresponding enthalpy value, and a corresponding temperature value. In other words, P-H-T database 61 may store various P-H-T data points for the $CO_2$ refrigerant. The P-H-T data points may be based on known properties and chemical characteristics of the $CO_2$ refrigerant and may be received from an external data source.

Figure 4:
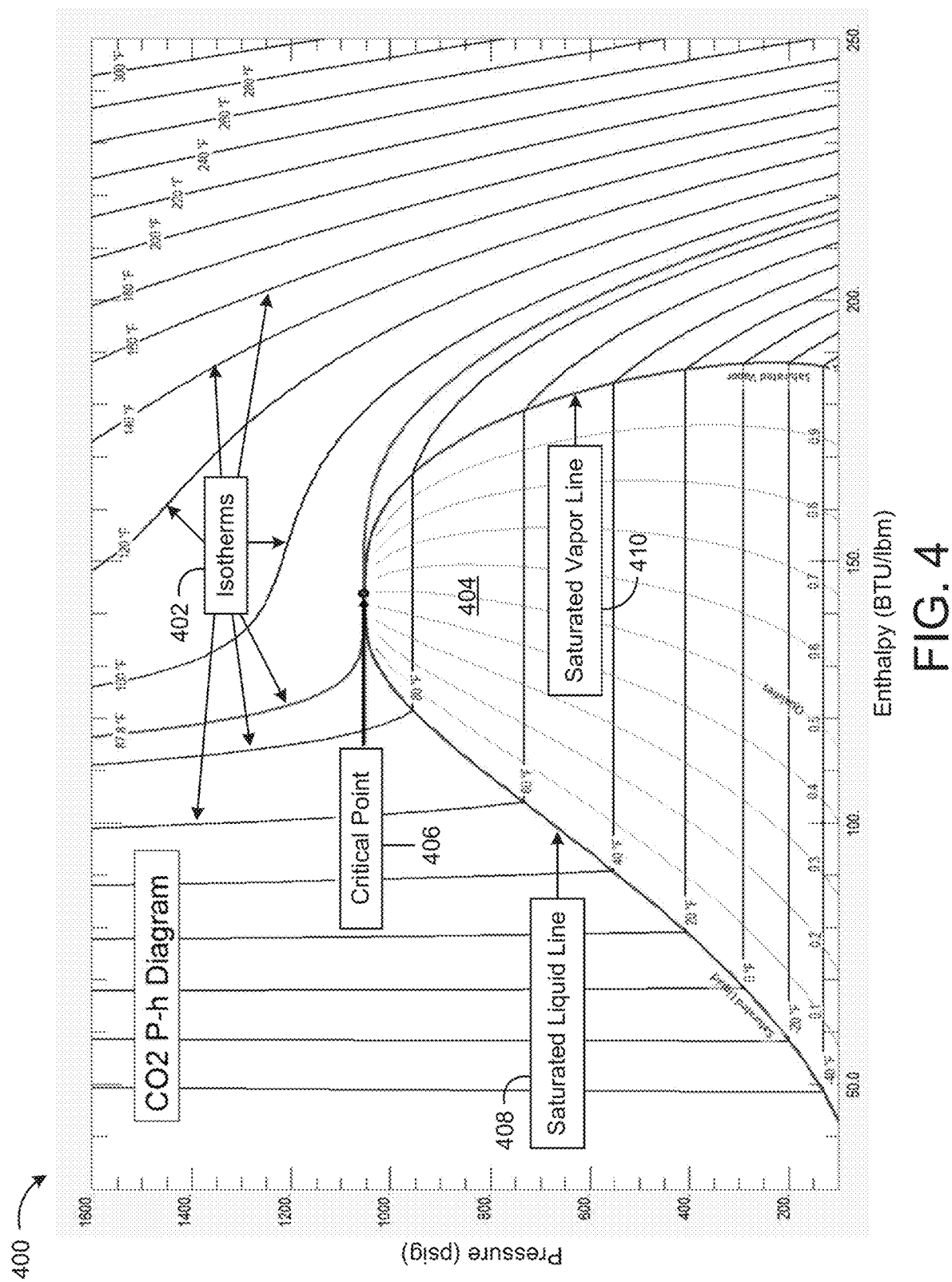
FIG. 4 is a pressure-enthalpy (P-H) diagram illustrating a set of pressure, enthalpy, and temperature (P-H-T) data that describes various potential states of a $CO_2$ refrigerant, according to an exemplary embodiment.

The data stored in P-H-T database 61 can be represented graphically as shown in FIG. 4. FIG. 4 is a pressure-enthalpy (P-H) diagram 400 of the $CO_2$ refrigerant. In P-H diagram 400, pressure is shown along the vertical axis, whereas enthalpy is shown along the horizontal axis. Isotherms 402 are curves of constant temperature that increase in value from left to right. Isotherms 402 having a temperature and pressure above the critical temperature $T_{crit}$ and critical pressure $P_{crit}$ defined by critical point 406 (i.e., supercritical isotherms) represent the supercritical region of the $CO_2$ refrigerant, whereas isotherms 402 having a temperature below the critical temperature $T_{crit}$ and/or a pressure below the critical pressure $P_{crit}$ (i.e., subcritical isotherms) represent the subcritical region of the $CO_2$ refrigerant. Subcritical isotherms 402 are somewhat parallel to the vertical axis in the liquid region to the left of saturated liquid line 408, exactly parallel to the horizontal axis in the two-phase region within vapor dome 404 (meaning there is no change in pressure as enthalpy increases within vapor dome 404), and have a semi-steep negative slope in the gas region to the right of saturated vapor line 410.

In the subcritical region of P-H diagram 400, the $CO_2$ refrigerant may exhibit well-defined and widely-accepted saturated temperatures and pressures where evaporation and condensation processes can occur. The saturated temperatures and pressures are shown as horizontal lines within vapor dome 404 between saturated liquid line 408 and saturated vapor line 410. However, the $CO_2$ refrigerant may not always be confined to saturated states; subcooled liquid or superheated gas states are common in vapor compression cycles. The subcooling of a liquid occurs when the refrigerant's pressure is greater than its saturation pressure at a given temperature. Conversely, a gas exists in a superheated state when the pressure of the refrigerant is less than its saturation pressure at a given subcritical temperature (i.e., when the temperature of the gas is below $T_{crit}$) or less than its critical pressure $P_{crit}$ at a given supercritical temperature (i.e., when the temperature of the gas is above $T_{crit}$). The portions of subcritical isotherms 402 to the left of saturated liquid line 408 represent the $CO_2$ refrigerant in a subcooled state, whereas the portions of subcritical isotherms 402 to the right of saturated vapor line 410 represent the $CO_2$ refrigerant in a superheated state. This notion of manipulating a refrigerant's pressure at a given temperature to achieve subcooling or superheat can be used in commercial refrigeration controls.

To move forward in this discussion, an understanding of the difference between a vapor and a gas is important. Vapor is characterized by a gas state which, during an isothermal process (maintaining constant temperature), can condense by increasing its pressure. For the $CO_2$ refrigerant, this can only occur if the temperature of the $CO_2$ refrigerant gas is less than the critical temperature $T_{crit}$ of the $CO_2$ refrigerant. If the temperature of the $CO_2$ refrigerant gas is greater than the critical temperature $T_{crit}$ of the $CO_2$ refrigerant and the pressure of the $CO_2$ refrigerant is increased isothermally, the $CO_2$ refrigerant gas will never condense into the liquid state. Therefore, a superheated gas that cannot condense is not a vapor and has no corresponding saturation pressure. However, careful observation of the $CO_2$ refrigerant's isotherms 402 in P-H diagram 400 can reveal that there is in fact a way to naturally associate pressures with non-vapor superheated gas temperatures.

Referring again to FIG. 3, pseudo-saturation pressure calculator 59 is shown to include an isotherm extractor 62 and an inflection point identifier 63. Isotherm extractor 62 may identify the supercritical isotherms of the $CO_2$ refrigerant using the P-H-T data stored in P-H-T database 61. Each supercritical isotherm may be defined by a set of P-H-T data points that have the same supercritical temperature. In some embodiments, isotherm extractor 62 generates pressure-enthalpy functions that represent the supercritical isotherms. For example, each supercritical isotherm 402 may be represented by a function that defines pressure as a function of enthalpy (i.e., $P=f(H)$). In some embodiments, isotherm extractor 62 uses a regression process to fit a curve (e.g., a cubic polynomial) to the set of P-H-T points that define each supercritical isotherm.

Inflection point identifier 63 may receive the supercritical isotherms from isotherm extractor 62. Inflection point identifier 63 can be configured to identify the inflection point of each supercritical isotherm. The inflection point of a supercritical isotherm can be defined as the point at which the change in pressure per unit enthalpy along the supercritical isotherm reaches a minimum. In other words, the inflection point of a supercritical isotherm is the point at which the slope of the supercritical isotherm is closest to zero. These inflection points are shown graphically in FIG. 5A as isotherm inflection points 508.

Referring now to FIG. 5A, another pressure-enthalpy (P-H) diagram 500 representing the P-H-T data for the $CO_2$ refrigerant is shown, according to an exemplary embodiment. P-H diagram 500 is shown to include several isotherms 502. Some of isotherms 502 have a temperature less than the critical temperature $T_{crit}$ (defined by critical point 506), pass through vapor dome 504, and are therefore subcritical isotherms 502. Other isotherms 502 have a temperature above $T_{crit}$, do not pass through vapor dome 504, and are therefore supercritical isotherms 502. Isotherm inflection points represent the points along each supercritical isotherm 502 at which the slope of the supercritical isotherm 502 is closest to zero.

Inflection point identifier 63 can identify the inflection point of each supercritical isotherm 508 using an analytical or numerical technique. For example, inflection point identifier 63 can use a pressure-enthalpy function that defines a supercritical isotherm 502 (i.e., $P=f(H)$) to calculate the slope of the supercritical isotherm 502 as a function of enthalpy value, as shown in the following equation:

$$\frac{dP}{dH} = f(H)$$

Inflection point identifier 63 can then identify the enthalpy value H at which the slope $$\frac{dP}{dH}$$

is closest to zero and can select the corresponding P-H-T data point as the inflection point 508 of the supercritical isotherm 502.

As another example, inflection point identifier 63 can use the set of P-H-T data that defines a supercritical isotherm 502 to calculate changes in pressure $\Delta P$ and changes in enthalpy $\Delta H$ between each pair of adjacent P-H-T data points. Inflection point identifier 63 can then identify the pair of P-H-T data points at which the value of $\Delta P/\Delta H$ is closest to zero. Inflection point identifier 63 can select either P-H-T data point in the identified pair as the inflection point 508 or can interpolate between the identified pair of P-H-T data points to calculate the inflection point 508 (e.g., an average of the P-H-T data points in the pair). Inflection point identifier 63 can repeat this process for each supercritical isotherm 502 to identify the corresponding inflection point 508.

Referring again to FIG. 3, pseudo-saturation pressure calculator 59 is shown to include a pseudo-saturation function generator 64. Pseudo-saturation function generator 64 may receive the inflection points 508 from inflection point identifier 63. Each inflection point 508 may include a pressure value, an enthalpy value, and a temperature value. Pseudo-saturation function generator 64 can use the temperature values and pressure values of the inflection points 508 to fit a two-dimensional line to the inflection points 508, shown in FIG. 5A as pseudo-saturated line 510. Pseudo-saturated line 510 can be generated by fitting a line to inflection points 508 using any of a variety of curve fitting techniques (e.g., polynomial regression). In some embodiments, pseudo-saturated line 510 a linear (i.e., straight) line that best fits inflection points 508. In other embodiments, pseudo-saturated line 510 may be quadratic, cubic, or may have any other polynomial order. Pseudo-saturated line 510 may pass through all of inflection points 508 or may be a line that best fits inflection points 508.

Pseudo-saturated line 510 may define a relationship between temperature and pseudo-saturation pressure $P_{sat}*$ for various supercritical states of the $CO_2$ refrigerant. In some embodiments, pseudo-saturation function generator 64 generates a function that defines pseudo-saturated line 510 (i.e., a pseudo-saturation function). The pseudo-saturation function may define a pseudo-saturation pressure $P_{sat}*$ as a function of a supercritical temperature of the $CO_2$ refrigerant (i.e., $P_{sat}*=f(T)$). The pseudo-saturation function may be an equation that represents pseudo-saturated line 510 and may define the points along pseudo-saturated line 510. In other words, each point along pseudo-saturated line 510 may be a solution to the pseudo-saturation function $P_{sat}*=f(T)$. The pseudo-saturation function $P_{sat}*=f(T)$ can be generated by fitting a polynomial function (e.g., a linear function, a quadratic function, a cubic function, etc.) to inflection points 508, as previously described.

Figure 5B:
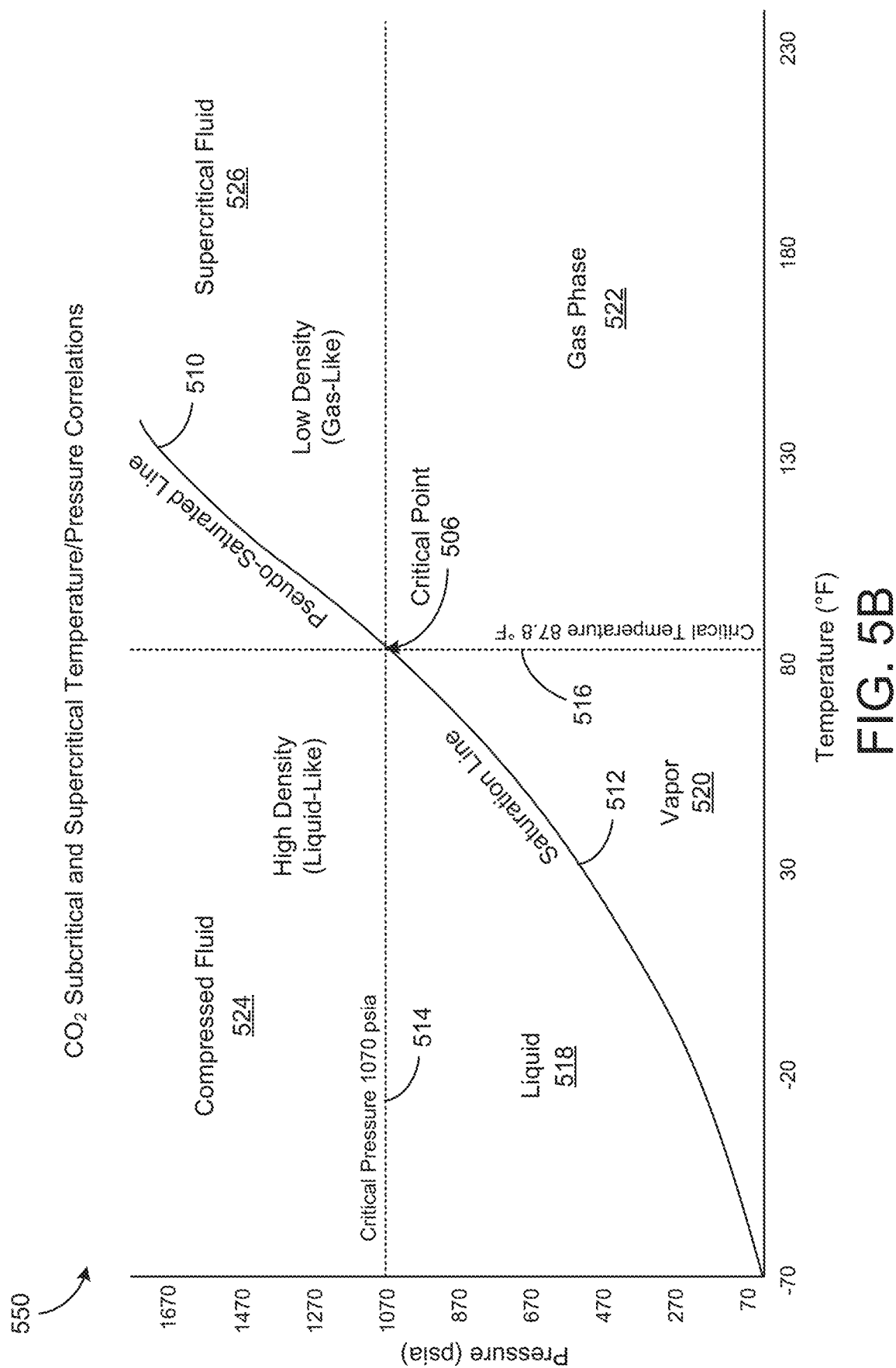
FIG. 5B is a pressure-temperature (P-T) diagram showing a subcritical saturation line and supercritical pseudo-saturated line of the $CO_2$ refrigerant, according to an exemplary embodiment.

Referring now to FIG. 5B, a pressure-temperature graph 550 representing the pressure and temperature data (a subset of the P-H-T data) for the $CO_2$ refrigerant is shown, according to an exemplary embodiment. In graph 550, line 514 represents the critical pressure $P_{crit}$ of the $CO_2$ refrigerant (i.e., 1070 pisa) whereas line 516 represents the critical temperature $T_{crit}$ of the $CO_2$ refrigerant (i.e., 87.8° F.). The intersection of lines 514 and 516 defines the critical point 506.

When both the temperature of the $CO_2$ refrigerant is below the critical temperature $T_{crit}$ and the pressure of the $CO_2$ refrigerant is below the critical pressure $P_{crit}$, the $CO_2$ refrigerant can exist as a liquid (within liquid region 518), a vapor (within vapor region 520), or as a liquid-vapor mixture (along saturation line 512). When the temperature of the $CO_2$ refrigerant is above the critical temperature $T_{crit}$ and the pressure of the $CO_2$ refrigerant is below the critical pressure $P_{crit}$, the $CO_2$ refrigerant is a gas (within gas region 522). When the temperature of the $CO_2$ refrigerant is below the critical temperature $T_{crit}$ and the pressure of the $CO_2$ refrigerant is above the critical pressure $P_{crit}$, the $CO_2$ refrigerant is a high density (liquid-like) compressed fluid (within compressed fluid region 524). When both the temperature of the $CO_2$ refrigerant is above the critical temperature $T_{crit}$ and the pressure of the $CO_2$ refrigerant is above the critical pressure $P_{crit}$, the $CO_2$ refrigerant is a low density (gas-like) supercritical fluid (within supercritical fluid region 526).

In graph 550, vapor dome 504 (shown in FIG. 5A) is collapsed into a single saturation line 512. Saturation line 512 defines the boundary of vapor dome 504 for subcritical states of the $CO_2$ refrigerant and terminates at critical point 506 (at the top of vapor dome 504). In some embodiments, pseudo-saturated line 510 is continuous with saturation line 512 and extends from critical point 506 into supercritical fluid region 526. Accordingly, pseudo-saturated line 510 can be thought of as the extension of saturation line 512 into supercritical fluid region 526.

Referring again to FIG. 3, pseudo-saturation pressure calculator 59 is shown to include a dynamic subcooling temperature adjuster 66 and a pressure setpoint calculator 65. Dynamic subcooling temperature adjuster 66 may receive the temperature $T_{GC}$ of the $CO_2$ refrigerant measured by temperature sensor 33 and the dynamic pseudo-subcooling value $T_{SC,dynamic}$ generated by pseudo-subcooling value generator 57. Dynamic subcooling temperature adjuster 66 may add the temperature $T_{GC}$ to the dynamic pseudo-subcooling value $T_{SC,dynamic}$ to calculate a temperature T (i.e., $T=T_{GC}+T_{SC,dynamic}$) and can provide the calculated temperature T to pressure setpoint calculator 65.

Pressure setpoint calculator 65 can receive the pseudo-saturation function $P_{sat}*=f(T)$ from pseudo-saturation function generator 64 and the calculated temperature T from dynamic subcooling temperature adjuster 66. Pressure setpoint calculator 65 may apply the calculated temperature T as an input to the pseudo-saturation function $P_{sat}*=f(T)$ to calculate a corresponding pseudo-saturation pressure $P_{sat}*$. The calculated pseudo-saturation pressure $P_{sat}*$ may be a point along pseudo-saturated line 510 that has the calculated temperature T. Pressure setpoint calculator 65 may then set the pressure setpoint $P_{sp}$ equal to the calculated pseudo-saturation pressure $P_{sat}*$ and provide the pressure setpoint $P_{sp}$ to valve controller 60.

Pressure Control Process

Figure 6:
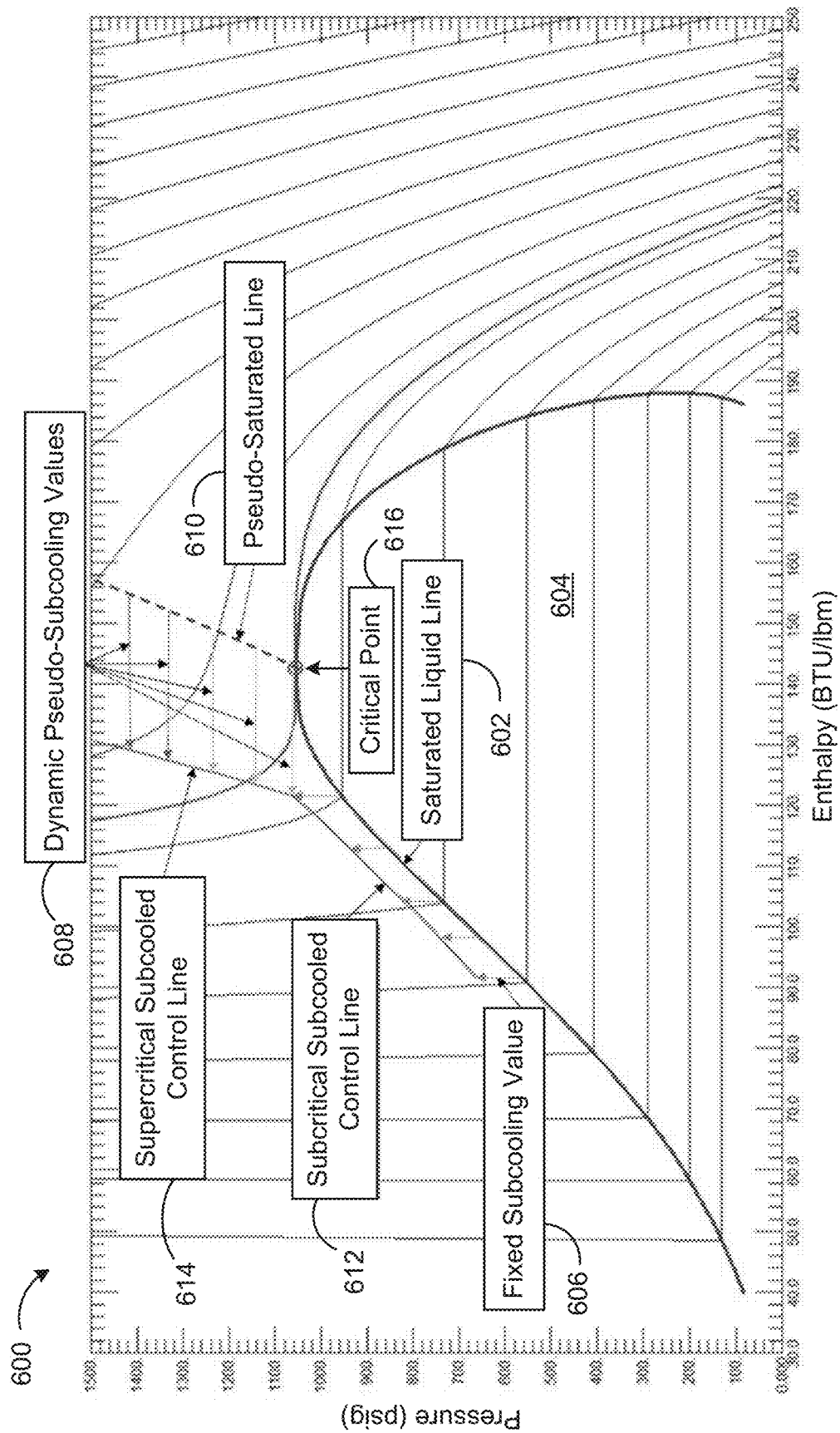
FIG. 6 is another P-H diagram comparing the states of the $CO_2$ refrigerant when controlled using a subcritical control technique and a supercritical control technique, according to an exemplary embodiment.
Figure 7:
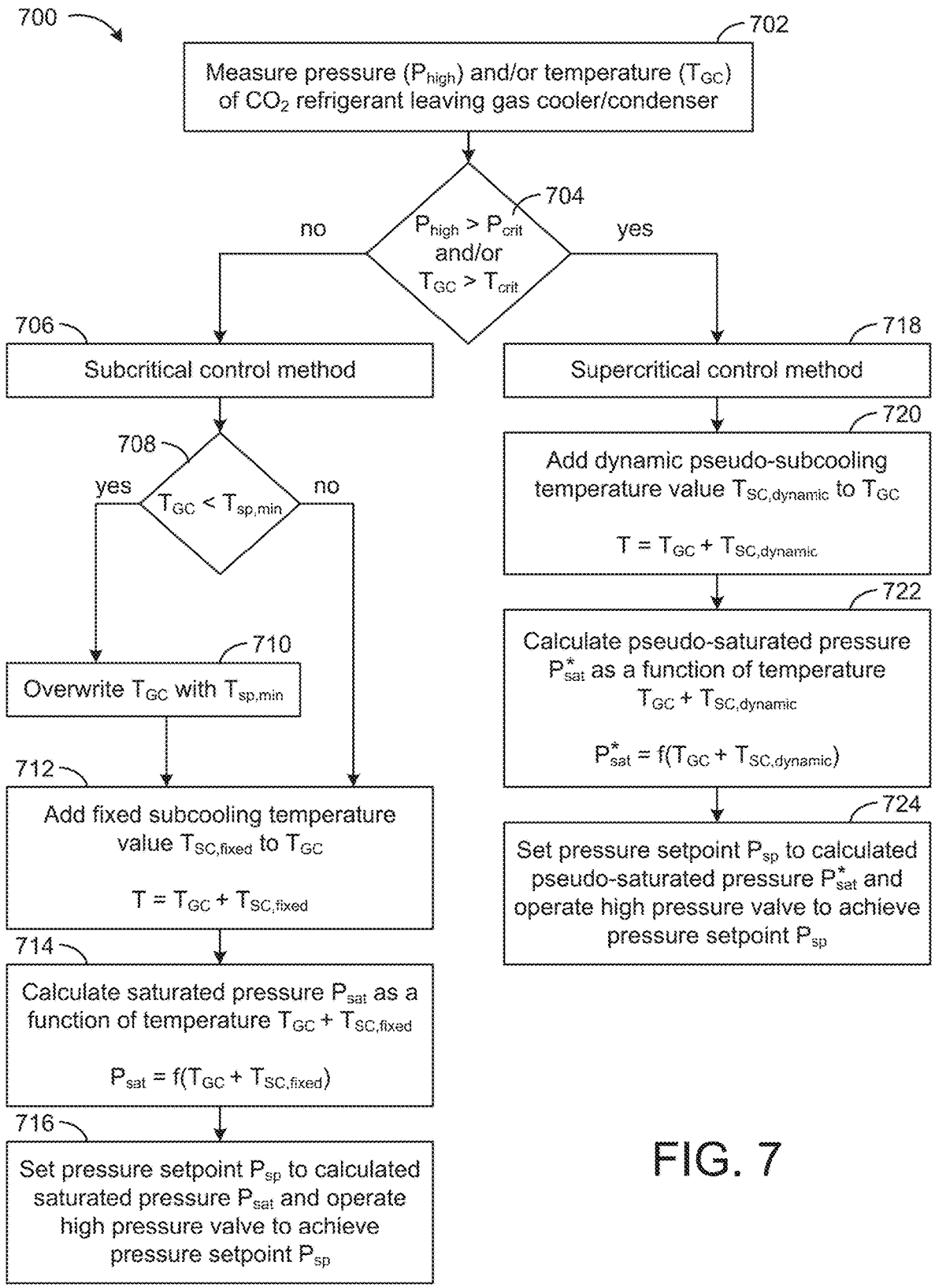
FIG. 7 is a flowchart of a pressure control process which can be performed by the controller of FIG. 2, according to an exemplary embodiment.

Referring now to FIGS. 6 and 7, a pressure-enthalpy (P-H) diagram 600 and flowchart illustrating a pressure control process 700 performed by controller 50 are shown, according to exemplary embodiments.

Process 700 is shown to include measuring the pressure $P_{high}$ and/or the temperature $T_{GC}$ of the $CO_2$ refrigerant leaving gas cooler/condenser 2 (step 702). The pressure $P_{high}$ can be measured by a pressure sensor 34 positioned at the exit of gas cooler/condenser 2 or along a fluid conduit 3 coupled to the exit of gas cooler/condenser 2, whereas the temperature $T_{GC}$ can be measured by a temperature sensor 33 positioned at the exit of gas cooler/condenser 2 or along a fluid conduit 3 coupled to the exit of gas cooler/condenser 2, as shown in FIG. 2. The pressure $P_{high}$ and/or temperature $T_{GC}$ measured in step 702 may indicate whether the $CO_2$ refrigerant is in a subcritical region or a supercritical region.

Process 700 is shown to include comparing the measured pressure $P_{high}$ and/or temperature $T_{GC}$ with the critical pressure $P_{crit}$ and/or temperature $T_{crit}$ of the $CO_2$ refrigerant defined by critical point 616 (step 704). If the measured pressure $P_{high}$ is not greater than the critical pressure $P_{crit}$ and/or the measured temperature $T_{GC}$ is not greater than the critical temperature $T_{crit}$ (i.e., the result of step 704 is "no"), the pressure of the $CO_2$ refrigerant is controlled using a subcritical control method (step 706). Accordingly, a point defining the state of the $CO_2$ refrigerant may be located within vapor dome 604 or along an isotherm that passes through vapor dome 604. However, if the measured pressure $P_{high}$ is greater than the critical pressure $P_{crit}$ and/or the measured temperature $T_{GC}$ is greater than the critical temperature $T_{crit}$ (i.e., the result of step 704 is "yes"), the pressure of the $CO_2$ refrigerant is controlled using a supercritical control method (step 718). Accordingly, a point defining the state of the $CO_2$ refrigerant may be along an isotherm that does not pass through vapor dome 604. In some embodiments, the supercritical control method is used when the measured $P_{high}$ is greater than the critical pressure $P_{crit}$, regardless of whether the measured temperature $T_{GC}$ is greater than the critical temperature $T_{crit}$.

In response to selecting the subcritical control method (step 706), process 700 may proceed with comparing the measured temperature $T_{GC}$ with a minimum temperature setpoint $T_{sp,min}$ of the $CO_2$ refrigerant (step 708). If the measured temperature $T_{GC}$ is less than the minimum temperature setpoint $T_{sp,min}$ (i.e., the result of step 708 is "yes"), process 700 may include overwriting the measured temperature $T_{GC}$ with the minimum temperature setpoint $T_{sp,min}$ (step 710) and proceeding to step 712. However, if the measured temperature $T_{GC}$ is greater than or equal to than the minimum temperature setpoint $T_{sp,min}$ (i.e., the result of step 708 is "no"), process 700 may proceed directly to step 712 without adjusting the measured temperature $T_{GC}$.

Process 700 is shown to include adding a fixed subcooling temperature value $T_{SC,fixed}$ 606 to the measured temperature $T_{GC}$ (step 712) and calculating a saturated pressure $P_{sat}$ as a function of the summed temperature $T_{GC}+T_{SC,fixed}$ (step 714). The fixed subcooling value $T_{SC,fixed}$ 606 added in step 712 results in a subcritical subcooled control line 612 that is substantially parallel to the saturated liquid line 602 defining the left edge of vapor dome 604. The saturated pressure $P_{sat}$ calculated in step 714 is the saturated pressure corresponding to the summed temperature $T_{GC}+T_{SC,fixed}$. However, because the actual temperature of the $CO_2$ refrigerant is $T_{GC}$ and not $T_{GC}+T_{SC,fixed}$, the state of the $CO_2$ refrigerant will be along subcritical subcooled control line 612 and not saturated liquid line 602 when the pressure of the $CO_2$ refrigerant is controlled to $P_{sat}$.

Process 700 is shown to include setting the pressure setpoint $P_{sp}$ equal to the saturated pressure $P_{sat}$ calculated in step 714 and operating high pressure valve 4 to achieve the pressure setpoint (step 716). Accordingly, the temperature of the $CO_2$ refrigerant at the exit of gas cooler/condenser 2 will be $T_{GC}$ and the pressure of the $CO_2$ refrigerant at the exit of gas cooler/condenser 2 will be $P_{sat}(T_{GC}+T_{SC,fixed})$, which places the state of the $CO_2$ refrigerant along subcritical subcooled control line 612.

Returning to step 704, in response to selecting the supercritical control method (step 718), process 700 may proceed to adding a dynamic pseudo-subcooling temperature value $T_{SC,dynamic}$ 608 to the measured temperature $T_{GC}$ (step 720). The dynamic pseudo-subcooling temperature value $T_{SC,dynamic}$ 608 may vary as a function of the measured temperature $T_{GC}$ and results in a supercritical subcooled control line 614. Supercritical subcooled control line 614 may be sloped relative to pseudo-saturated line 610 due to different values of $T_{SC,dynamic}$ being added in step 720 for different measured temperatures $T_{GC}$. The values of $T_{SC,dynamic}$ can also be manipulated by a user to control the pressure either higher or lower than the default $T_{SC,dynamic}$ value at any value of the measured temperature $T_{GC}$ in the supercritical control method. A graphical illustration for manipulating the values of $T_{SC,dynamic}$ is shown in FIG. 8. As described above, pseudo-saturated line 610 may be the line that passes through or best fits the inflection points of the supercritical isotherms in P-H diagram 600.

Process 700 may then proceed to calculating a pseudo-saturated pressure $P_{sat}*$ as a function of the summed temperature $T_{GC}+T_{SC,dynamic}$ (step 722). The pseudo-saturated pressure $P_{sat}*$ calculated in step 722 is the pressure defined by pseudo-saturated line 610 at the summed temperature $T_{GC}+T_{SC,dynamic}$. However, because the actual temperature of the $CO_2$ refrigerant is $T_{GC}$ and not $T_{GC}+T_{SC,dynamic}$, the state of the $CO_2$ refrigerant will be along supercritical subcooled control line 614 and not pseudo-saturated line 610 when the pressure of the $CO_2$ refrigerant is controlled to $P_{sat}*$.

Process 700 is shown to include setting the pressure setpoint $P_{sp}$ equal to the pseudo-saturated pressure $P_{sat}*$ calculated in step 722 and operating high pressure valve 4 to achieve the pressure setpoint (step 724). Accordingly, the temperature of the $CO_2$ refrigerant at the exit of gas cooler/condenser 2 will be $T_{GC}$ and the pressure of the $CO_2$ refrigerant at the exit of gas cooler/condenser 2 will be $P_{sat}*(T_{GC}+T_{SC,dynamic})$, which places the state of the $CO_2$ refrigerant along supercritical subcooled control line 614.

Graphical Illustration of Control

Referring now to FIG. 8, a graphical illustration 800 for adjusting the dynamic pseudo-subcooling temperature values $T_{SC,dynamic}$ is shown, according to an exemplary embodiment. Graphical illustration 800 is shown to include two graphs 810 and 820 and a transcritical control pressure modifier 822. Graph 810 is a pressure-temperature graph, whereas graph 820 is a pressure-enthalpy graph. Both graphs 810 and 820 illustrate several subcooled control lines 812, 814, 816, and 818 for the $CO_2$ refrigerant.

Line 818 is a subcritical subcooled control line (similar to line 612 in diagram 600) and defines the subcooled control region for a range of subcritical temperatures of the $CO_2$ refrigerant (i.e., 83° F. or less). In some embodiments, control line 818 is formed by adding a fixed subcooling value to the saturated liquid line along the left edge of the vapor dome. Line 816 is another subcritical subcooled line (similar to line 612 in diagram 600) and defines the subcooled control region for a range of subcritical temperatures of the $CO_2$ refrigerant (i.e., between 84° F. and 87° F.). In some embodiments, control line 816 is formed by adding dynamic pseudo-subcooling temperature values $T_{SC,dynamic}$ to the saturated liquid line along the left edge of the vapor dome.

Line 812 is a baseline supercritical subcooled control line (similar to line 614 in diagram 600) and defines a baseline subcooled control region for supercritical temperatures of the $CO_2$ refrigerant (i.e., above 87° F.). In some embodiments, control line 812 is formed by adding baseline dynamic pseudo-subcooling temperature values $T_{SC,dynamic}$ to pseudo-saturated line 610. Line 814 is a modified supercritical subcooled control line (similar to line 614 in diagram 600) and defines a modified subcooled control region for supercritical temperatures of the $CO_2$ refrigerant (i.e., above 87° F.). In some embodiments, control line 814 is formed by adding adjustable dynamic pseudo-subcooling temperature values $T_{SC,dynamic}$ to pseudo-saturated line 610.

A user can adjust the slope of modified supercritical subcooled control line 814 (relative to baseline supercritical subcooled control line 812) by adjusting transcritical control pressure modifier 822. Setting transcritical control pressure modifier 822 to a negative value may cause the slope of modified supercritical subcooled control line 814 to be lesser (i.e., less positive or more negative) than the slope of baseline supercritical control line 812. Increasingly negative values of transcritical control pressure modifier 822 may cause the slope of modified supercritical subcooled control line 814 to be more negative (or less positive). When the value of transcritical control pressure modifier 822 is negative, the dynamic pseudo-subcooling temperature values $T_{SC,dynamic}$ may decrease as the measured temperature $T_{GC}$ of the $CO_2$ refrigerant increases. For example, the dynamic pseudo-subcooling temperature values $T_{SC,dynamic}$ may be close to 5° F. at relatively lower values of the measured temperature $T_{GC}$ and decrease to approximately 3.6° F. at relatively higher values of the measured temperature $T_{GC}$.

Conversely, setting transcritical control pressure modifier 822 to a positive value may cause the slope of modified supercritical subcooled control line 814 to be greater than the slope of baseline supercritical control line 812. Increasingly positive values of transcritical control pressure modifier 822 may cause the slope of modified supercritical subcooled control line 814 to be more positive. When the value of transcritical control pressure modifier 822 is positive, the dynamic pseudo-subcooling temperature value $T_{SC,dynamic}$ may increase as the measured temperature $T_{GC}$ of the $CO_2$ refrigerant increases. For example, the dynamic pseudo-subcooling temperature values $T_{SC,dynamic}$ may be close to 5° F. at relatively lower values of the measured temperature $T_{GC}$ and increase to approximately 6.4° F. at relatively higher values of the measured temperature $T_{GC}$.

Configuration of Exemplary Embodiments

The construction and arrangement of the $CO_2$ refrigeration system as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:
1. A refrigeration system comprising:
  a gas cooler/condenser configured to remove heat from a refrigerant and discharge the refrigerant into a high pressure conduit;
  a temperature sensor located along the high pressure conduit and configured to measure a temperature of the refrigerant leaving the gas cooler/condenser;
  a pressure sensor located along the high pressure conduit and configured to measure a pressure of the refrigerant leaving the gas cooler/condenser;
  a pressure control valve located along the high pressure conduit and operable to regulate the pressure of the refrigerant leaving the gas cooler/condenser; and
  a controller configured to determine whether the refrigerant leaving the gas cooler/condenser is in a subcritical region based on at least one of the measured temperature of the refrigerant or the measured pressure of the refrigerant and, in response to determining that the refrigerant leaving the gas cooler/condenser is not in the subcritical region:
    add a pseudo-subcooling temperature value to the measured temperature of the refrigerant to calculate a summed temperature;
    calculate a supercritical pseudo-saturated pressure as a function of the summed temperature; and
    operate the pressure control valve to drive the pressure of the refrigerant leaving the gas cooler/condenser to the supercritical pseudo-saturated pressure corresponding to the summed temperature.

2. The refrigeration system of claim 1, wherein the controller is configured to:
generate a supercritical pseudo-saturation function for the refrigerant using supercritical pressure (P), enthalpy (H), and temperature (T) data for the refrigerant; and
calculate the supercritical pseudo-saturated pressure using the supercritical pseudo-saturation function.

3. The refrigeration system of claim 2, wherein the controller is configured to generate the supercritical pseudo-saturation function by:
identifying inflection points of supercritical P-H isotherms for the refrigerant using the supercritical P-H-T data for the refrigerant; and
deriving the supercritical pseudo-saturation function from the inflection points of the supercritical isotherms.

4. The refrigeration system of claim 3, wherein deriving the supercritical pseudo-saturation function from the inflection points of the supercritical isotherms comprises fitting a supercritical pseudo-saturated line to the inflection points of the supercritical isotherms.

5. The refrigeration system of claim 1, wherein:
the pseudo-subcooling temperature value is a dynamic value; and
the controller is configured to calculate the dynamic pseudo-subcooling temperature value as a function of the measured temperature of the refrigerant leaving the gas cooler/condenser.

6. The refrigeration system of claim 1, wherein:
the pseudo-subcooling temperature value is one of a plurality of pseudo-subcooling temperature values, each of which applies to a corresponding temperature of the refrigerant leaving the gas cooler/condenser; and
default values of the plurality of pseudo-subcooling temperature values are adjustable by a user to control the pressure of the refrigerant leaving the gas cooler/condenser to higher or lower pressures at any measured temperature of the refrigerant leaving the gas cooler/condenser.

7. The refrigeration system of claim 1, wherein the controller is configured to, in response to determining that the refrigerant leaving the gas cooler/condenser is in the subcritical region:
add a fixed temperature value to the measured temperature of the refrigerant to calculate a second summed temperature;
calculate a subcritical saturated pressure as a function of the second summed temperature; and
operate the pressure control valve to drive the pressure of the refrigerant leaving the gas cooler/condenser to the subcritical saturated pressure corresponding to the second summed temperature.

\* \* \* \* \*